(12) United States Patent
Hayashi et al.

(10) Patent No.: US 12,087,090 B2
(45) Date of Patent: Sep. 10, 2024

(54) INFORMATION PROCESSING SYSTEM AND INFORMATION PROCESSING METHOD

(71) Applicant: FUJIFILM Corporation, Tokyo (JP)

(72) Inventors: Daisuke Hayashi, Saitama (JP); Kenji Makino, Saitama (JP); Masahiro Terada, Saitama (JP); Shunta Ego, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 373 days.

(21) Appl. No.: 17/688,790

(22) Filed: Mar. 7, 2022

(65) Prior Publication Data

US 2022/0189200 A1 Jun. 16, 2022

Related U.S. Application Data

(63) Continuation of application No. PCT/JP2020/036173, filed on Sep. 25, 2020.

(30) Foreign Application Priority Data

Sep. 30, 2019 (JP) .................. 2019-180764

(51) Int. Cl.
*G06V 40/16* (2022.01)
*G06T 11/00* (2006.01)
(Continued)

(52) U.S. Cl.
CPC .......... *G06V 40/174* (2022.01); *G06T 11/001* (2013.01); *G06T 11/206* (2013.01); *G06V 10/762* (2022.01)

(58) Field of Classification Search
CPC .... G06V 40/174; G06V 10/762; G06V 20/35; G06V 40/175; G06T 11/001;
(Continued)

(56) References Cited

U.S. PATENT DOCUMENTS

| 2013/0100140 A1* | 4/2013 | Ye .................. G06T 13/40 345/473 |
| 2014/0051054 A1* | 2/2014 | Wong ................ G09B 7/02 434/350 |

(Continued)

FOREIGN PATENT DOCUMENTS

| JP | 2007097047 | 4/2007 |
| JP | 2011237970 | 11/2011 |

(Continued)

OTHER PUBLICATIONS

A. -D. Farcas and A. Marginean, "EmotionSense: Real-time Emotional Feedback from the Audience," 2019 IEEE 15th International Conference on Intelligent Computer Communication and Processing (ICCP), Cluj-Napoca, Romania, 2019, pp. 387-393, (Year: 2019).*

(Continued)

*Primary Examiner* — Andrae S Allison
(74) *Attorney, Agent, or Firm* — JCIPRNET

(57) ABSTRACT

Provided are an information processing system and an information processing method which can easily grasp a state of a person in a predetermined area. The information processing system includes a first imaging unit that images a performer, a second imaging unit that images a person in a predetermined area, a first recognition unit that recognizes a scene based on an image captured by the first imaging unit, a second recognition unit that recognizes expression of the person based on an image captured by the second imaging unit, a calculation unit that calculates a state index of the person according to the scene based on a recognition result of the scene and a recognition result of the expression of the person, a heat map creation unit that creates a heat map representing the state index of the person in association with (Continued)

a position of the person in the predetermined area, and an output unit that outputs the heat map.

13 Claims, 23 Drawing Sheets

(51) Int. Cl.
  *G06T 11/20* (2006.01)
  *G06V 10/762* (2022.01)
(58) Field of Classification Search
  CPC ....... G06T 11/206; G06T 7/00; G06T 7/0002; G06T 2207/20081; G06T 2207/20084; G06T 2207/30201; G06T 2207/30232; G06T 2207/30242; G06F 3/01; G06F 3/0484; G06F 3/011; H04N 7/18; H04N 7/181; H04N 9/3179
  See application file for complete search history.

(56) References Cited

U.S. PATENT DOCUMENTS

| | | | | |
|---|---|---|---|---|
| 2014/0337328 | A1* | 11/2014 | Sarvabhotla | G06Q 10/10 |
| | | | | 707/723 |
| 2016/0111019 | A1* | 4/2016 | Chang | G09B 19/06 |
| | | | | 434/185 |
| 2017/0150218 | A1* | 5/2017 | Oobuchi | H04N 21/442 |
| 2017/0169727 | A1* | 6/2017 | Briggs | G09B 5/06 |
| 2017/0372584 | A1* | 12/2017 | Brown | A61B 5/0002 |
| 2018/0152538 | A1* | 5/2018 | Assem Aly Salama | ..................... |
| | | | | H04L 47/24 |
| 2020/0120386 | A1 | 4/2020 | Oobuchi et al. | |
| 2020/0279279 | A1* | 9/2020 | Chaudhuri | G06N 5/04 |
| 2020/0320478 | A1* | 10/2020 | Crawford | H04L 65/1066 |
| 2023/0199039 | A1* | 6/2023 | Nguyen | H04L 65/4025 |
| | | | | 709/204 |

FOREIGN PATENT DOCUMENTS

| | | |
|---|---|---|
| JP | 2016012216 | 1/2016 |
| WO | 2016009865 | 1/2016 |

OTHER PUBLICATIONS

S. Yang, C. N. Reed, E. Chew and M. Barthet, "Examining Emotion Perception Agreement in Live Music Performance," in IEEE Transactions on Affective Computing, vol. 14, No. 2, pp. 1442-1460, Apr.-Jun. 1, 2023 (Year: 2023).*

Kayser et al, Audience facial expressions detected by automated face analysis software reflect emotions in music, Behavior Research Methods (2022) 54:1493-1507 (Year: 2022).*

"International Search Report (Form PCT/ISA/210) of PCT/JP2020/036173," mailed on Dec. 8, 2020, with English translation thereof, pp. 1-5.

"Written Opinion of the International Searching Authority (Form PCT/ISA/237)" of PCT/JP2020/036173, mailed on Dec. 8, 2020, with English translation thereof, pp. 1-6.

* cited by examiner

| AUDIENCE No. | COORDINATE POSITION (x, y) | EXPRESSION SCORE | | |
|---|---|---|---|---|
| | | LAUGH | ANGER | GRIEF |
| 1 | (100, 100) | 100 | 20 | 10 |
| 2 | (200, 100) | 30 | 20 | 20 |
| 3 | (300, 100) | 20 | 20 | 10 |
| 4 | (400, 100) | 100 | 10 | 10 |
| 5 | (500, 100) | 20 | 10 | 10 |
| ⋮ | ⋮ | ⋮ | ⋮ | ⋮ |
| n | (i, j) | xxx | xxx | xxx |

FIG. 7

| DEGREE OF EXCITEMENT | 1 TO 10 | 11 TO 20 | 21 TO 30 | 31 TO 40 | 41 TO 50 | 51 TO 60 | 61 TO 70 | 71 TO 80 | 81 TO 90 | 91 TO 100 |
|---|---|---|---|---|---|---|---|---|---|---|
| DISPLAY | | | | | | | | | | |

INFORMATION PROCESSING SYSTEM AND INFORMATION PROCESSING METHOD

CROSS-REFERENCE TO RELATED APPLICATIONS

The present application is a Continuation of PCT International Application No. PCT/JP2020/036173 filed on Sep. 25, 2020 claiming priority under 35 U.S.C § 119(a) to Japanese Patent Application No. 2019-180764 filed on Sep. 30, 2019. Each of the above applications is hereby expressly incorporated by reference, in its entirety, into the present application.

BACKGROUND OF THE INVENTION

1. Field of the Invention

The present invention relates to an information processing system and an information processing method.

2. Description of the Related Art

WO2016/009865A discloses the technology of visualizing a degree of excitement of a user who watches a motion picture by a heat map and presenting the visualized degree of excitement to a performer or the like in a venue in a service for delivering the motion picture in real time, such as a concert.

JP2016-12216A discloses the technology of calculating a degree of excitement of a conference from conference data recorded as voice and/or video.

SUMMARY OF THE INVENTION

One embodiment according to the technology of the present disclosure provides an information processing system and an information processing which can easily grasp a state of a person in a predetermined area.

(1) The information processing system comprising a first imaging unit that images a performer, a second imaging unit that images a person in a predetermined area, a first recognition unit that recognizes a scene based on an image captured by the first imaging unit, a second recognition unit that recognizes expression of the person based on an image captured by the second imaging unit, a calculation unit that calculates a state index of the person according to the scene based on a recognition result of the scene and a recognition result of the expression of the person, a heat map creation unit that creates a heat map representing the state index of the person in association with a position of the person in the predetermined area, and an output unit that outputs the heat map.

(2) The information processing system according to (1), further comprising a setting unit that sets a number of clusters based on a transmission ability of the performer, and a clustering unit that performs clustering on the heat map according to the set number of clusters, in which the output unit outputs the clustered heat map.

(3) The information processing system according to (2), in which the clustering unit performs clustering on the heat map for data of the person having the state index equal to or more than a threshold value.

(4) The information processing system according to (2) or (3), further comprising an estimation unit that estimates the transmission ability of the performer based on the image captured by the first imaging unit.

(5) The information processing system according to any one of (2) to (4), in which the transmission ability includes at least one of skill or remaining power of the performer.

(6) The information processing system according to any one of (1) to (5), further comprising a transformation processing unit that transforms an image of the heat map into an image of a viewpoint different from a viewpoint of the second imaging unit.

(7) The information processing system according to any one of (1) to (6), further comprising an inversion processing unit that inverts color or shading of the heat map.

(8) The information processing system according to any one of (1) to (7), further comprising a display unit that displays the heat map output from the output unit.

(9) The information processing system according to any one of (1) to (7), further comprising a projection unit that projects the heat map output from the output unit onto the predetermined area.

(10) The information processing system according to (9), in which the projection unit projects the heat map onto the predetermined area by projection mapping.

(11) An information processing method comprising a step of imaging a performer, a step of imaging a person in a predetermined area, a step of recognizing a scene based on an image obtained by imaging the performer, a step of recognizing expression of the person in the predetermined area based on an image obtained by imaging the person, a step of calculating a state index of the person according to the scene based on a recognition result of the scene and a recognition result of the expression of the person, a step of creating a heat map representing the state index of the person in association with a position of the person in the predetermined area, and a step of outputting the heat map.

(12) The information processing method according to (11), further comprising a step of setting a number of clusters based on information on a transmission ability of the performer, and a step of performing clustering on the heat map according to the set number of clusters, in which in the step of outputting the heat map, the clustered heat map is output.

BRIEF DESCRIPTION OF THE DRAWINGS

FIG. 7 is a diagram showing a relationship between a degree of excitement and display on a heat map.

DESCRIPTION OF THE PREFERRED EMBODIMENTS

In the following, preferred embodiments of the present invention will be described in detail with reference to the accompanying drawings.

First Embodiment

A performer who performs a performance with respect to a large number of audiences controls a content of his/her performance while confirming a state of the audience. An ability of the performer to grasp the state of the audience depends largely on experience. In addition, even in a case in which the performer is experienced, in a case in which the number of audiences is increased too much, it will be difficult to accurately grasp the entire audiences. In the present embodiment, an information processing system and an information processing method which can easily grasp the state of the audience are provided.

System Configuration

Figure 1:
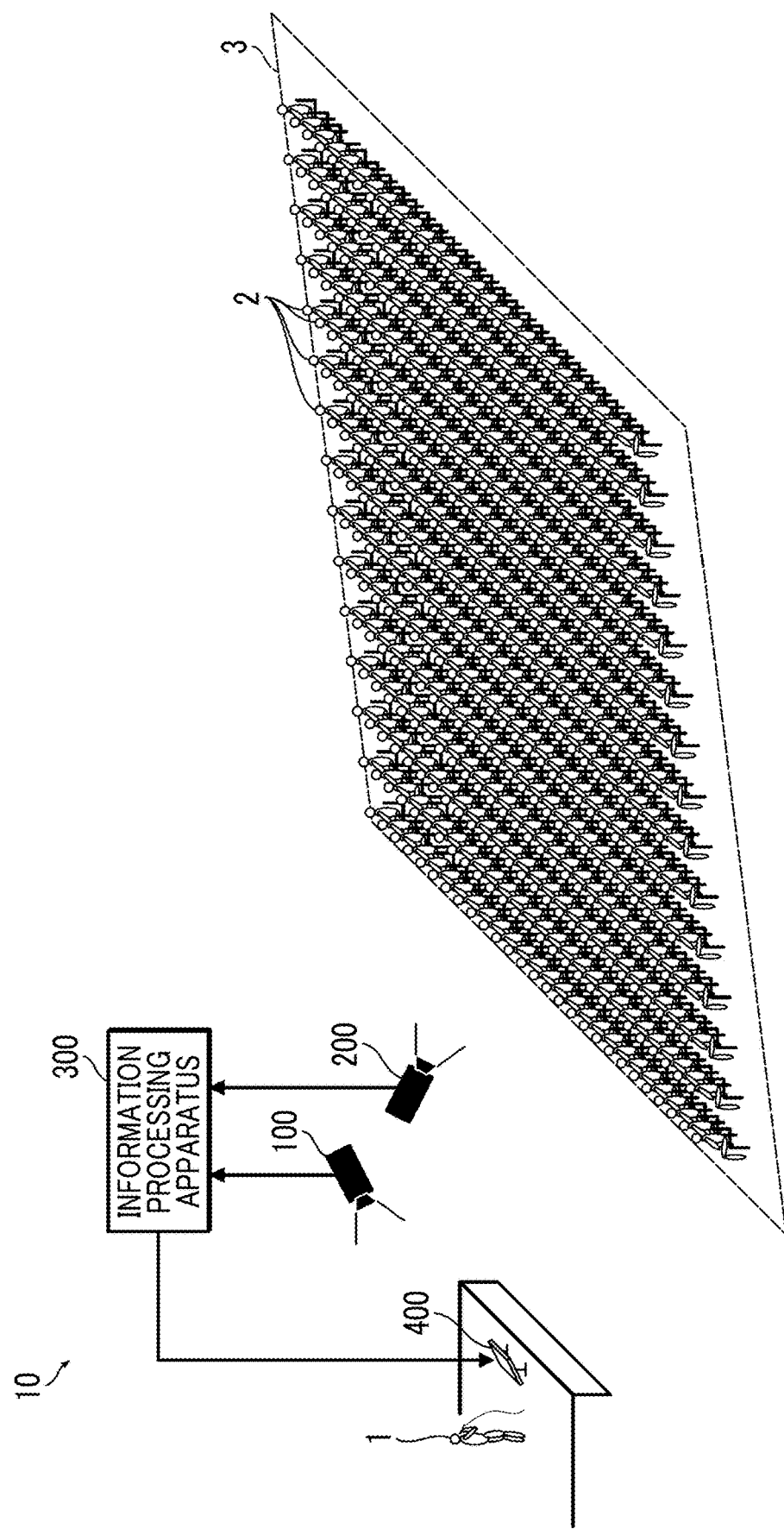
FIG. 1 is a diagram showing a schematic configuration of an information processing system.

FIG. 1 is a diagram showing a schematic configuration of the information processing system according to the present embodiment.

As shown in FIG. 1, an information processing system 10 of the present embodiment comprises a performer imaging apparatus 100, an audience imaging apparatus 200, an information processing apparatus 300, a display device 400, and the like.

[Performer Imaging Apparatus]

The performer imaging apparatus 100 images a performer 1. The performer 1 is a person who performs the performance. It should be noted that the performance here is not limited to artistic expression behavior, such as singing, acting, and performance, also includes a wide range of behavior, such as a speech and a lecture. That is, it means performing some kind of expression behavior with respect to the audience.

The performer imaging apparatus 100 is an example of a first imaging unit. The performer imaging apparatus 100 is configured by at least one camera. The camera is configured by a so-called video camera (including a digital still camera or the like having a motion picture imaging function (function of capturing a time-series image)), and continuously images the performer at a predetermined frame rate.

The image captured by the performer imaging apparatus 100 is used to recognize a scene. That is, the image is used to recognize the scene what the performance performed by the performer 1 is. Therefore, the performer imaging apparatus 100 is configured and installed to be suitable for the intended use. The image requirements required for scene recognition differ according to a content, a scale, and the like of the performance. Therefore, the cameras configuring the performer imaging apparatus 100 are appropriately selected according to the content, the scale, and the like of the performance, and are installed at the optimum positions.

[Audience Imaging Apparatus]

The audience imaging apparatus 200 images an audience 2. The audience imaging apparatus 200 images an audience area 3 in which the audience 2 is present from a certain position, and images the audience. The audience 2 is a person who sees (views, watches, listens, and the like) the performance by the performer 1. The audience area 3 in which the audience 2 is present is an example of a predetermined area. The audience 2 is an example of a person in a predetermined area.

The audience imaging apparatus 200 is an example of a second imaging unit. The audience imaging apparatus 200 is configured by at least one camera. In a case in which the audience area 3 cannot be imaged by one camera, the audience imaging apparatus 200 is configured by a plurality of cameras. In this case, the audience area 3 is divided into a plurality of areas, and each area is shared and imaged by the plurality of cameras. It should be noted that a configuration can be adopted in which the same area is imaged by the plurality of cameras. For example, a configuration can be adopted in which the audience 2 in the same area is imaged from different directions by the plurality of cameras. The camera is configured by a so-called video camera, and continuously images the audience 2 in a target area. Imaging is performed at the same frame rate as the performer imaging apparatus 100, and is performed in synchronization with the performer imaging apparatus 100. The synchronization in this case does not mean complete synchronization in a unit of frame.

The image captured by the audience imaging apparatus 200 is used to recognize the expression of the audience. Therefore, the camera configuring the audience imaging apparatus 200 is installed at a position at which a face of the audience 2 in the area that is an imaging target can be imaged, and is configured to have the performance that can recognize the expression of the audience from the captured image. That is, the resolution performance required and sufficient for recognizing the expression of the audience from the captured image is provided.

[Information Processing Apparatus]

The information processing apparatus 300 inputs an image of the performer captured by the performer imaging apparatus 100 and an image of the audience captured by the audience imaging apparatus 200, creates a heat map representing an excitement state of the audience 2, and outputs the created heat map to the display device 400.

Figure 2:
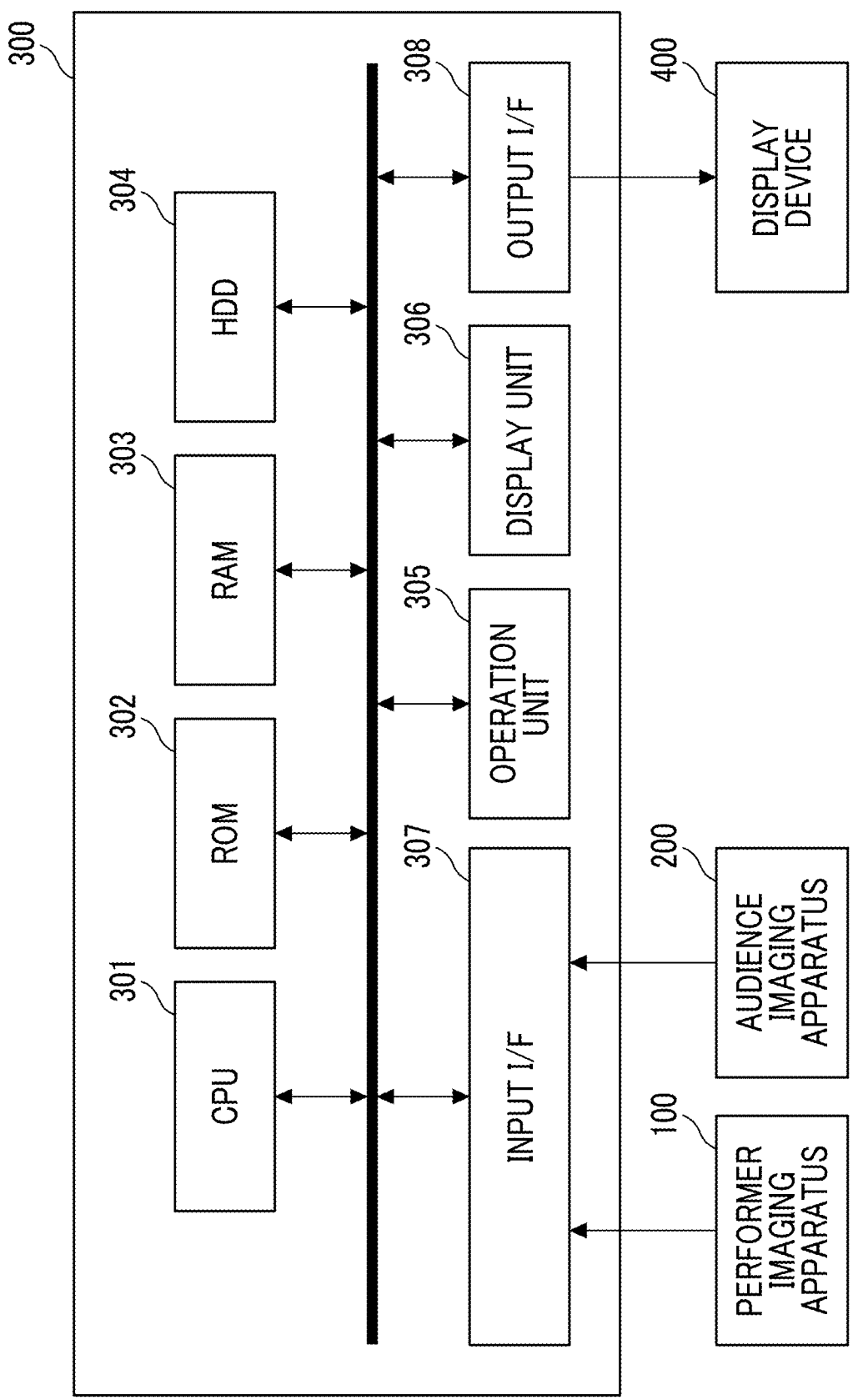
FIG. 2 is a block diagram showing an example of a hardware configuration of an information processing apparatus.

FIG. 2 is a block diagram showing an example of a hardware configuration of the information processing apparatus.

The information processing apparatus 300 is configured by a computer comprising a central processing unit (CPU) 301, a read only memory (ROM) 302, a random access memory (RAM) 303, a hard disk drive (HDD) 304, an operation unit (for example, a keyboard, a mouse, and a touch panel) 305, a display unit (for example, a liquid crystal display) 306, an input interface (I/F) 307, an output interface 308, and the like. The image data of the performer captured by the performer imaging apparatus 100 and the image data of the audience captured by the audience imaging apparatus 200 are input to the information processing apparatus 300 via the input interface 307. The heat map created by the information processing apparatus 300 is output to the display device 400 via the output interface 308.

Figure 3:
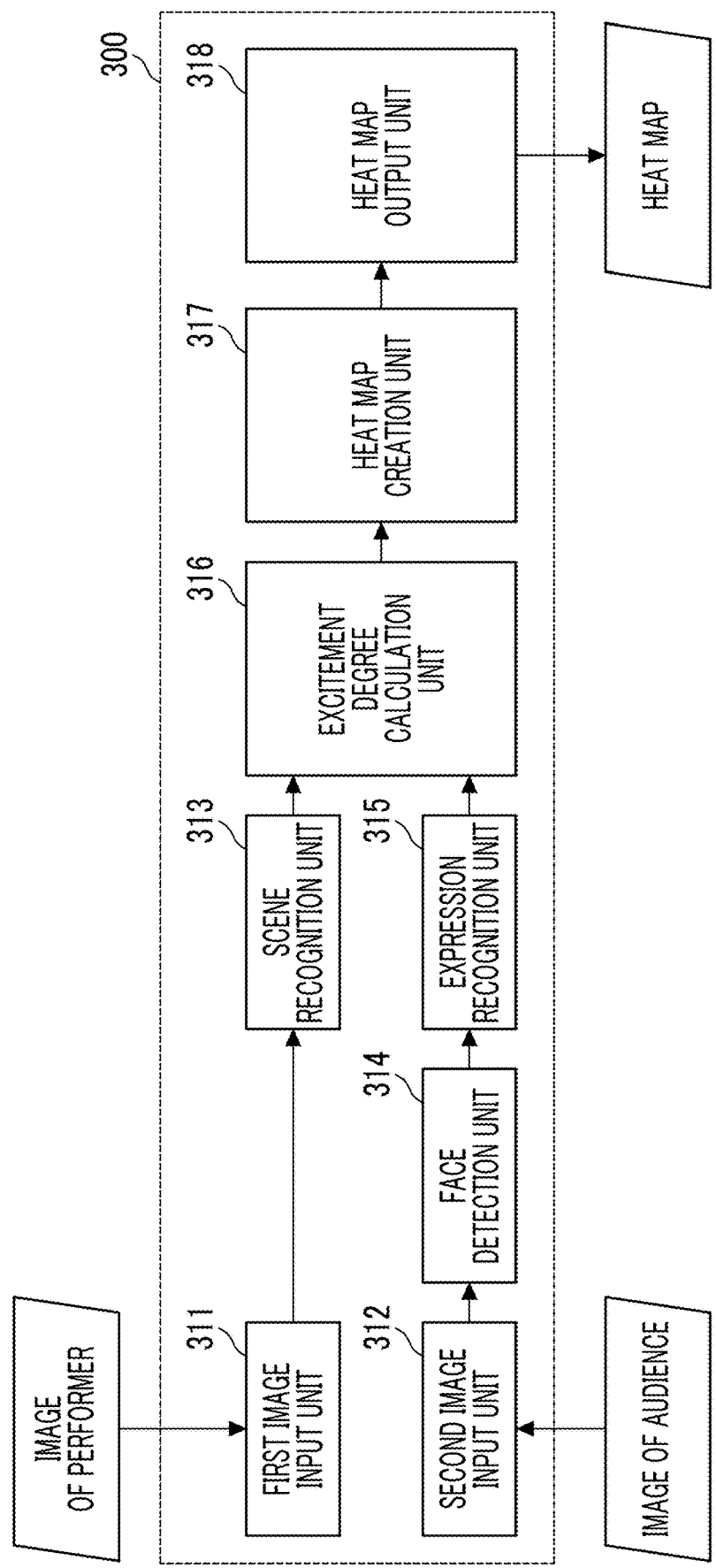
FIG. 3 is a block diagram of functions realized by the information processing apparatus.

FIG. 3 is a block diagram of functions realized by the information processing apparatus.

As shown in FIG. 3, the information processing apparatus 300 has functions of a first image input unit 311, a second image input unit 312, a scene recognition unit 313, a face detection unit 314, an expression recognition unit 315, an excitement degree calculation unit 316, a heat map creation unit 317, and a heat map output unit 318. Each function is realized by executing a predetermined program by the CPU as a processor.

The first image input unit 311 accepts the input of the image captured by the performer imaging apparatus 100. The image captured by the performer imaging apparatus 100 is an image obtained by imaging the performer 1. The image captured by the performer imaging apparatus 100 is input to the information processing apparatus 300 via the input interface 307.

The second image input unit 312 accepts the input of the image captured by the audience imaging apparatus 200. The image captured by the audience imaging apparatus 200 is an image obtained by imaging the audience area 3, and is an image captured by the audience 2. The image captured by the audience imaging apparatus 200 is input to the information processing apparatus 300 via the input interface 307. The input of the image is performed in synchronization with the first image input unit 311.

The scene recognition unit 313 is an example of a first recognition unit. The scene recognition unit 313 recognizes the scene of the performance performed by the performer 1 based on the image obtained by imaging the performer 1. The scene recognition unit 313 recognizes the scene within a predetermined classification range. For example, recognizable scenes, such as a scene that make the audience laugh, a scene that make the audience serious, a scene that make the audience excite, and a scene that make the audience angry, are predetermined, and the scene recognition unit 313 recognizes the scene within the predetermined range. A known technology can be adopted for the scene recognition. For example, a method of recognizing the scene by using an image recognition model generated by machine learning, deep learning, or the like can be adopted. The scene recognition is performed at predetermined time intervals. For example, it is the time interval between frames of the input image.

Figure 4:
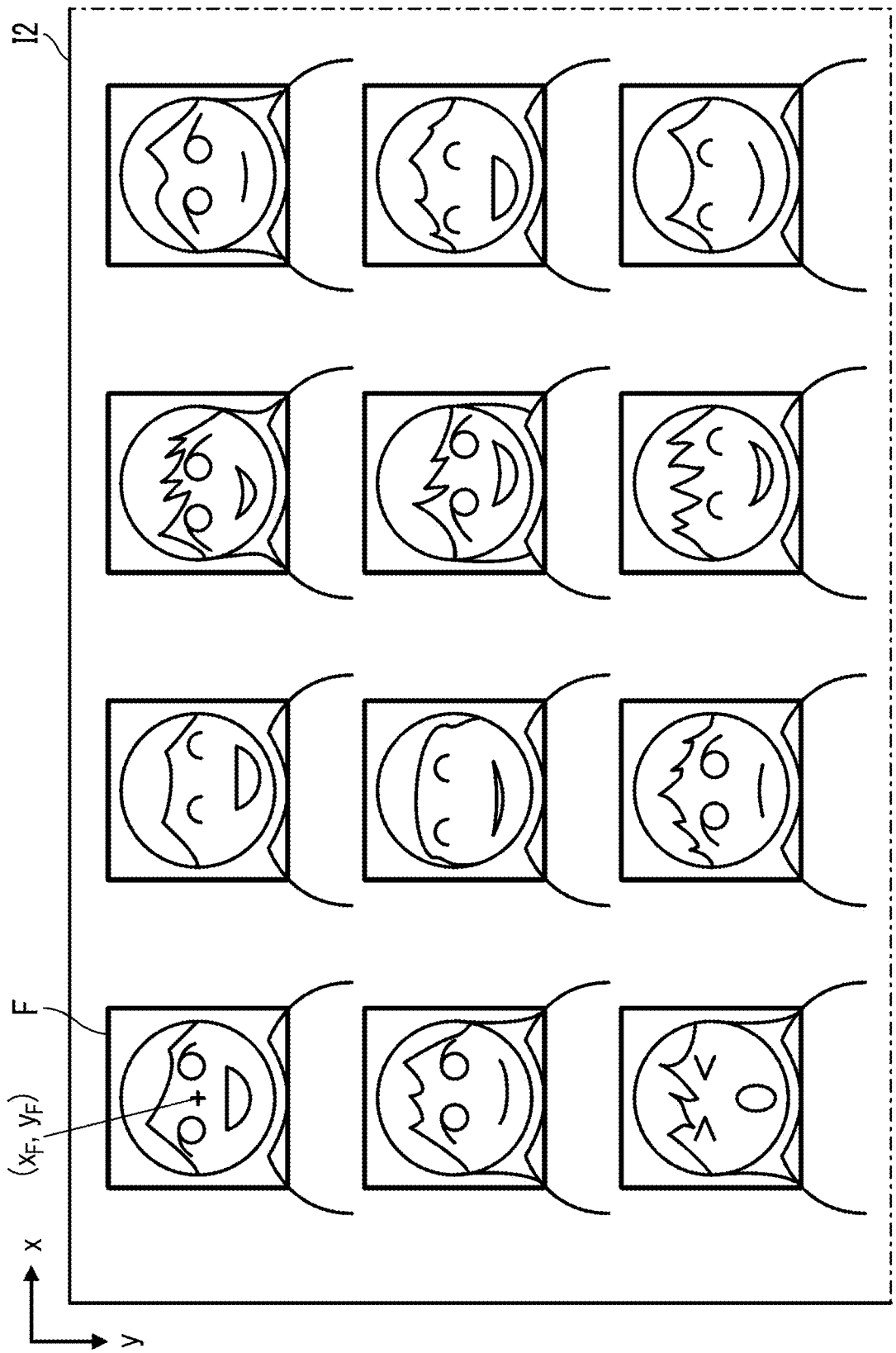
FIG. 4 is a conceptual diagram of face detection by a face detection unit.

The face detection unit 314 detects the face of the audience 2 from the image obtained by imaging the audience 2. FIG. 4 is a conceptual diagram of face detection by the face detection unit. The face detection unit 314 detects the face of the individual audience 2 from an image I2 obtained by imaging the audience 2, and specifies a position of the detected individual face. A known technology can be adopted for the face detection. The position of the face is specified by a coordinate position (x,y) in the image. Specifically, in a case of a frame F surrounding the detected face, it is specified by a center coordinate position $(x_F, y_F)$. The coordinate position in the image corresponds to an actual position of the audience. The face detection is performed, for example, by scanning the images in order from the upper left to the lower right. In addition, the detected faces are numbered in the order of detection. The face detection is performed at predetermined time intervals. For example, it is the time interval between frames of the input image.

Figures 5, 6:
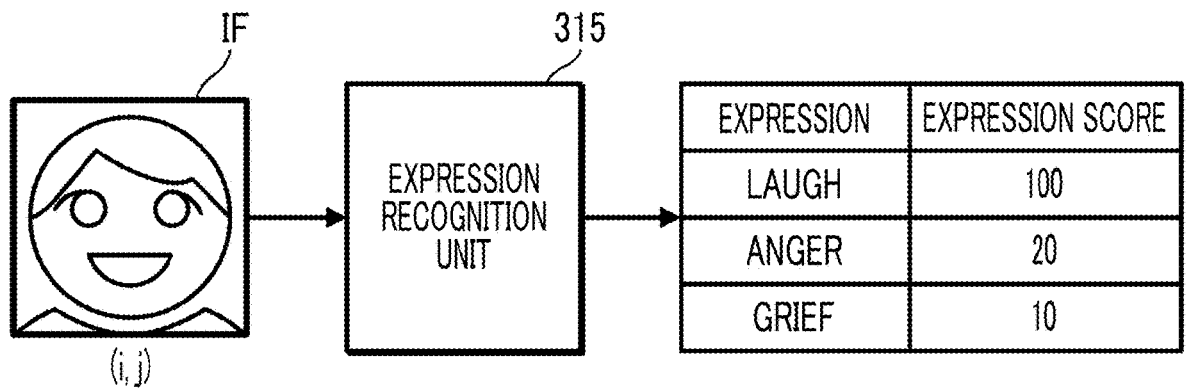
FIG. 5 is a conceptual diagram of facial expression recognition by an expression recognition unit.
FIG. 6 is a diagram showing an example of a result of expression recognition.

The expression recognition unit 315 is an example of a second recognition unit. FIG. 5 is a conceptual diagram of facial expression recognition by the expression recognition unit. The expression recognition unit 315 recognizes the facial expression of the audience 2 based on the image IF of the face of the audience 2 detected by the face detection unit 314. The expression recognition means discriminating the type of expression. The type of expression is represented by a word that indicates emotion. Therefore, the expression recognition means specifying the type of expression by the word indicating the emotion. Specifying expression may be specifying by a single word indicating the emotion or specifying by a combination of the words indicating the emotion. In a case in which words that indicate the emotion are combined, the word that indicates each emotion may be weighted. In the present embodiment, the facial expression is classified into three types of "laugh", "anger", and "grief". As a result of the expression recognition, a score (expression score) obtained by quantifying a degree of each expression (also referred to as an expression degree) is output. The expression score is output with a maximum value set to 100, for example. It should be noted that the expression score may be output such that the sum of the respective degrees of the expression is 100.

A known technology can be adopted for the expression recognition. For example, similar to the scene recognition, a method of recognizing the expression by using an image recognition model generated by machine learning, deep learning, or the like can be adopted.

FIG. 6 is a diagram showing an example of the result of expression recognition. As shown in FIG. 6, the expression score is obtained for each audience by performing the expression recognition by the expression recognition unit 315. It should be noted that the position of each audience is specified by the face detection unit 314 by the coordinate position in the image.

The excitement degree calculation unit 316 calculates the degree of excitement of each audience according to the scene based on the recognition results of the scene recognition unit 313 and the expression recognition unit 315. The excitement degree calculation unit 316 is an example of a calculation unit. The degree of excitement is a numerical value indicating the degree of excitement (level of excitement) of each audience. The degree of excitement is an example of a state index. The degree of excitement is calculated from the expression score by using a predetermined arithmetic expression. In a case in which the expression score of laugh is defined as S1, the expression score of anger is defined as S2, and the expression score of grief is defined as S3, for example, an arithmetic expression Fn is defined as Fn=a×S1+b×S3+c×S4. a, b, and c are coefficients (weights) determined for each scene, a is a coefficient for the expression of laugh, b is a coefficient for the expression of anger, and c is a coefficient for the expression of grief. For example, it is assumed that the coefficients a, b, and c of laugh, anger, and grief determined for a certain scene are a=0.9, b=0.05, and c=0.05. In addition, it is assumed that the expression scores of a certain audience are laugh: 100, anger: 20, and grief: 10. In this case, the degree of excitement of the audience in the scene is obtained by using the above arithmetic expression: Fn=0.9×S1+0.05×S3+0.05×S4=0.9×100+0.05×20+0.05×10=91.5. In addition, it is assumed that the expression scores of a certain audience are laugh: 30, anger: 20, and grief: 20. In this case, the degree of excitement of the audience in the scene is obtained by using the above arithmetic expression: Fn=0.9×30+0.05×20+0.05×20=29. The information of the coefficients a, b, and c is stored in the ROM 302, the RAM 303, or the HDD 304 for each scene.

The heat map creation unit 317 creates the heat map based on the information on the degree of excitement of each audience calculated by the excitement degree calculation unit 316. The heat map is created by representing the degree of excitement of each audience in association with the position of each audience. The degree of excitement is represented by color or shading.

FIG. 7 is a diagram showing a relationship between the degree of excitement and display on the heat map. FIG. 7 shows an example of representing the degree of excitement by the shading. Within the range that can be calculated, the degree of excitement is divided into a plurality of categories. A concentration to be displayed is determined for each of the divided categories. FIG. 7 shows an example in which the degree of excitement is calculated by a numerical value from 1 to 100, and also shows an example in which the degree of excitement is divided into 10 categories and displayed. In addition, an example is shown in which the displayed concentration is increased as the degree of excitement is increased.

Here, an example of the heat map created by the heat map creation unit 317 will be described. Here, a case will be considered in which the performer performs the performance at an event venue in front of a large number of audiences. For example, one singer sings a song at a concert venue.

Figure 8:
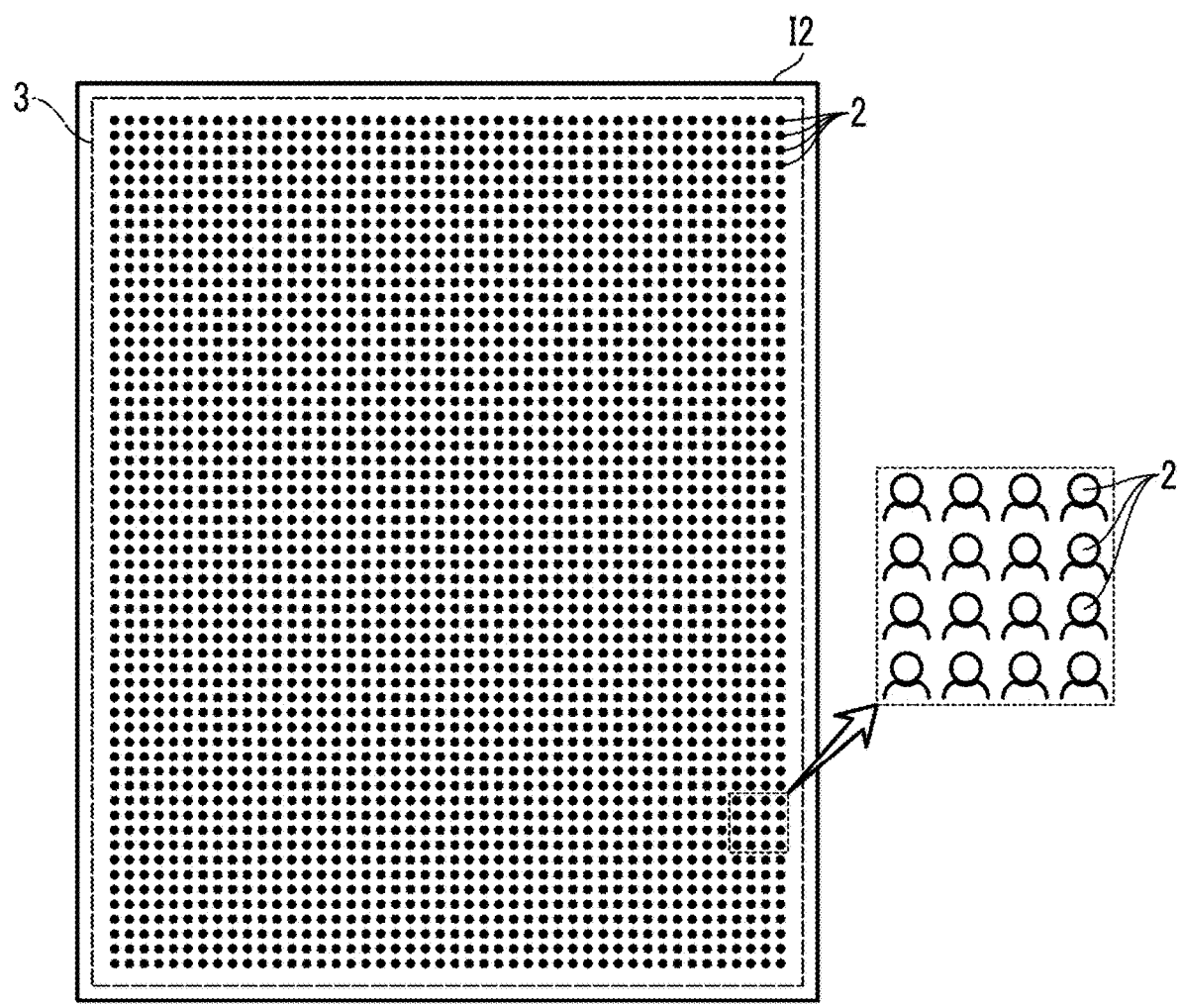
FIG. 8 is a diagram showing an example of an image captured by an audience imaging apparatus.

FIG. 8 is a diagram showing an example of the image captured by the audience imaging apparatus.

In FIG. 8, a reference numeral 2 is the audience and a reference numeral 3 is the audience area. The audience 2 watches the performance performed by the performer in an audience seat provided in the audience area 3.

Figure 9:
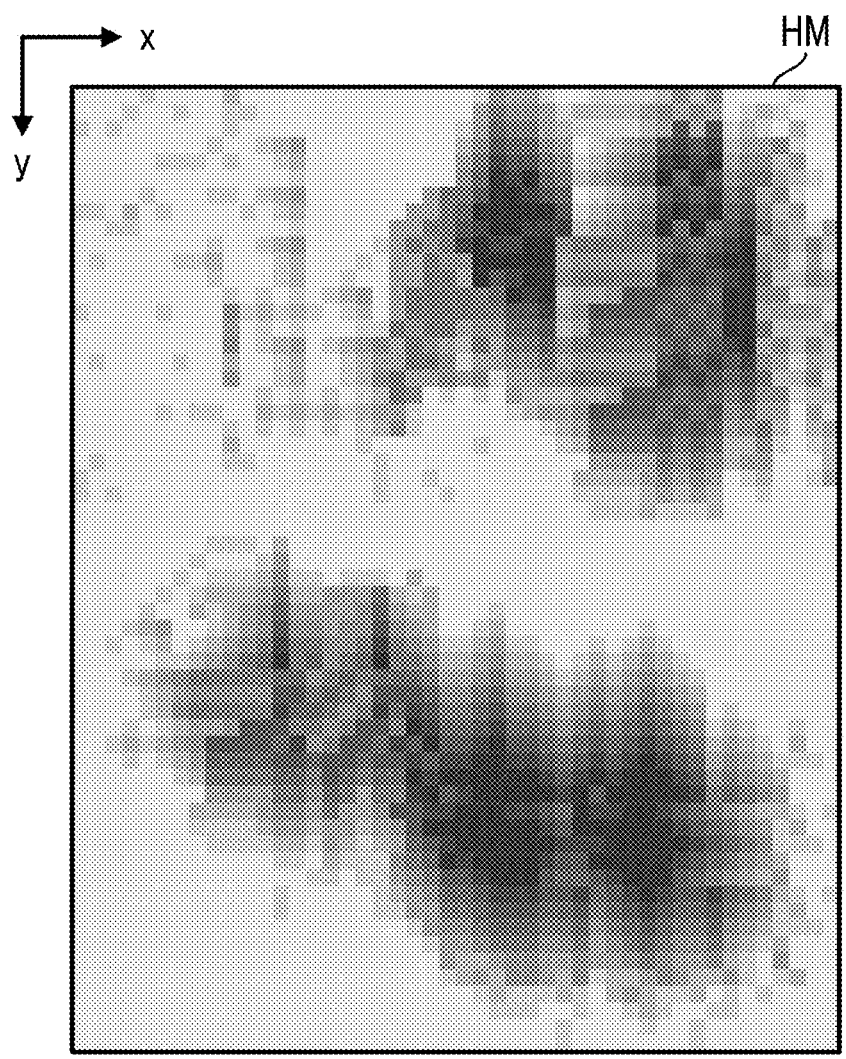
FIG. 9 is a diagram showing an example of the heat map to be created.

FIG. 9 is a diagram showing an example of the heat map to be created. In addition, FIG. 10 is a diagram showing a positional relationship between the heat map and the audience.

Figure 10:
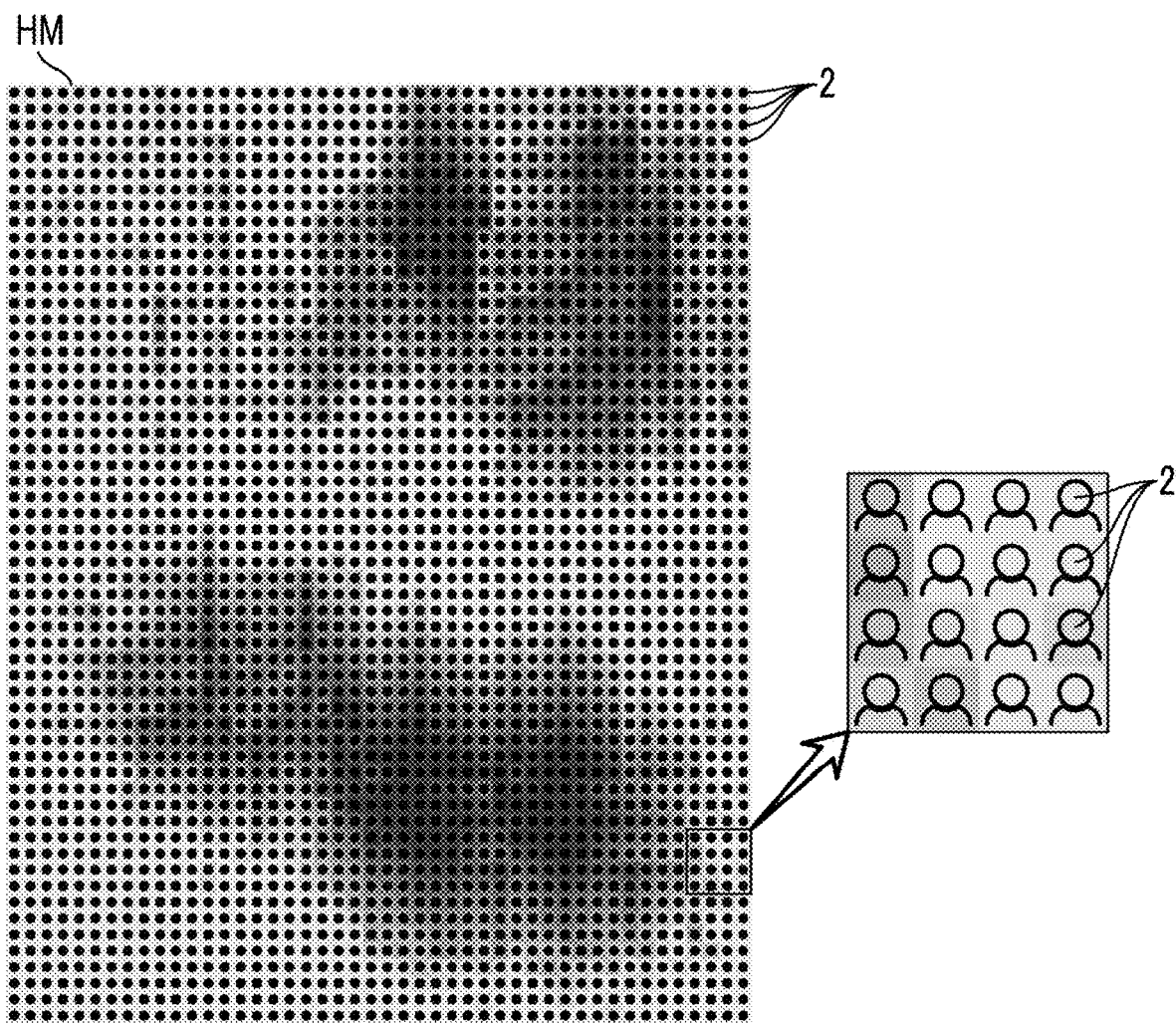
FIG. 10 is a diagram showing a positional relationship between the heat map and an audience.

As shown in FIGS. 9 and 10, a heat map HM is created by representing the degree of excitement of each audience 2 in association with the position of each audience 2 by using the color or the shading of a specific color. By representing the degree of excitement of each audience 2 by the heat map HM, the degree of excitement of the entire venue can be visually represented. As a result, the state of the audience 2 can be easily grasped.

The heat map output unit 318 is an example of an output unit. The heat map output unit 318 outputs the heat map HM created by the heat map creation unit 317 to the display device 400.

[Display Device]

The display device 400 is an example of a display unit. The display device 400 displays the heat map output from the information processing apparatus 300. The display device 400 is configured by, for example, a liquid crystal display, a plasma display, an organic electroluminescence (EL) display (organic light emitting diode display), a field emission display, a flat panel display, such as electronic paper, or a projector and a screen (or a screen equivalent). The display device 400 is installed at a position at which the performer 1 can be visually recognized.

Action

Figure 11:
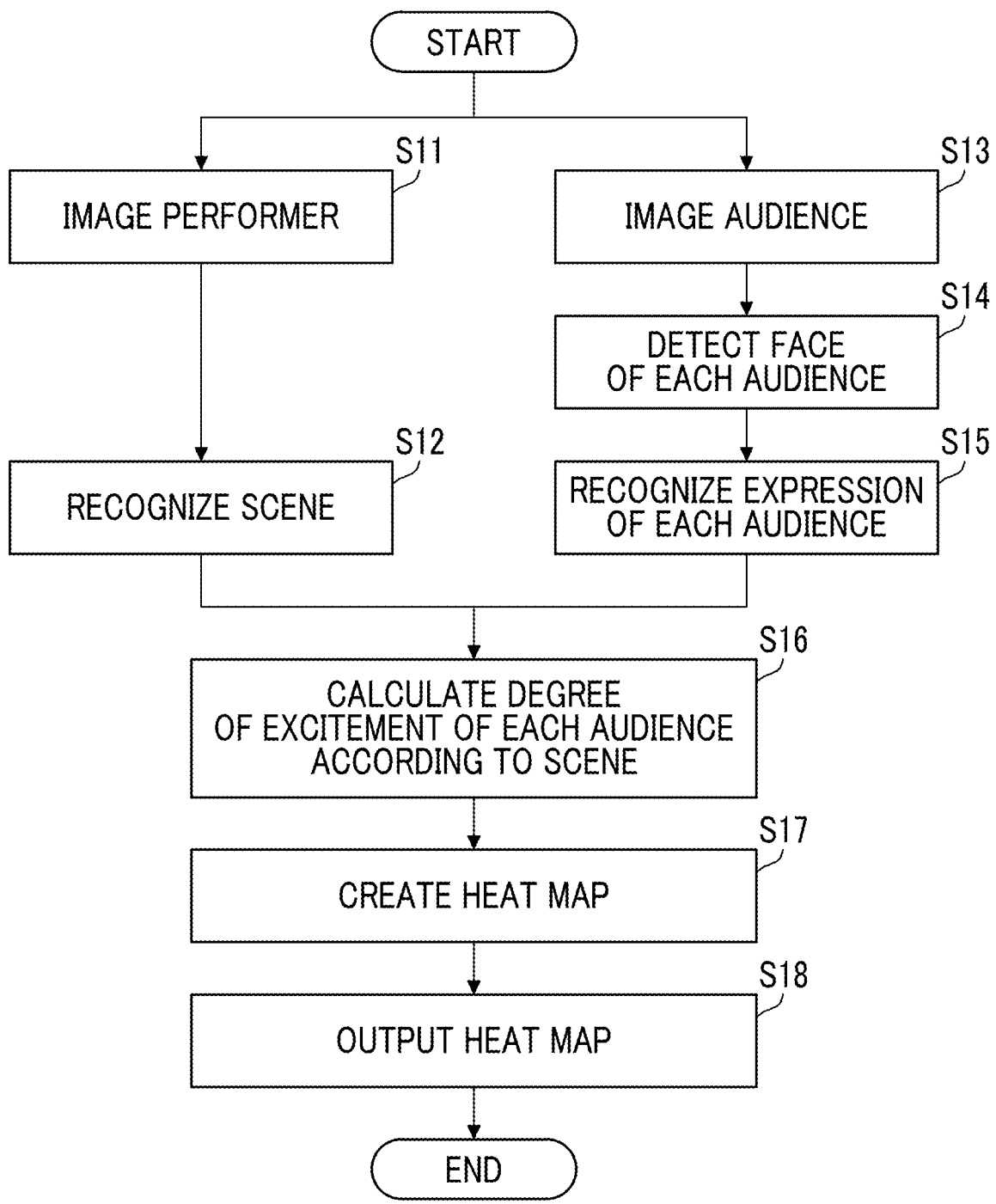
FIG. 11 is a flowchart showing an information processing procedure.

FIG. 11 is a flowchart showing an information processing procedure (information processing method) by the information processing system according to the present embodiment.

First, the performer 1 is imaged by the performer imaging apparatus 100 (step S11). In parallel with this, the audience area 3 is imaged by the audience imaging apparatus 200, and the audience 2 in the audience area 3 is imaged (step S13).

Then, the scene of the performance performed by the performer 1 is recognized from the image of the performer 1 captured by the performer imaging apparatus 100 (step S12). In addition, the face of each audience 2 is detected from the image of the audience area 3 captured by the audience imaging apparatus 200 (step S14), and the expression of the detected face is recognized (step S15).

Then, the degree of excitement of each audience 2 according to the scene is calculated based on the recognition result of the scene and the recognition result of the expression (step S16). That is, the expression score of each audience 2 is converted into the degree of excitement by using a conversion expression according to the scene and the expression, and the degree of excitement of each audience 2 is obtained.

Then, the heat map is created based on the obtained information on the degree of excitement of each audience 2 (step S17). The heat map is created by representing the degree of excitement of each audience 2 in association with the position of each audience 2 (see FIG. 9).

Then, the created heat map is output to the display device 400 and displayed on the screen (step S18). By visually recognizing the heat map displayed on the display device 400, the performer 1 can grasp the excitement state of the audience in the audience area 3. As a result, it is possible to easily decide the content of the performance to be performed. That is, for example, in a case in which the excitement is uneven, the performance will be performed such that the unevenness disappears throughout the venue. In addition, in a case in which the excitement is low, the content of the performance is changed such that the audience is excited. In this way, it is possible to easily control the content of the performance from the heat map.

Second Embodiment

In the information processing system according to the present embodiment, the clustered heat map is output. The information processing system according to the present embodiment is the same as the information processing system according to the first embodiment, except that the clustered heat map is output. Therefore, only clustering will be described in the following.

Figure 12:
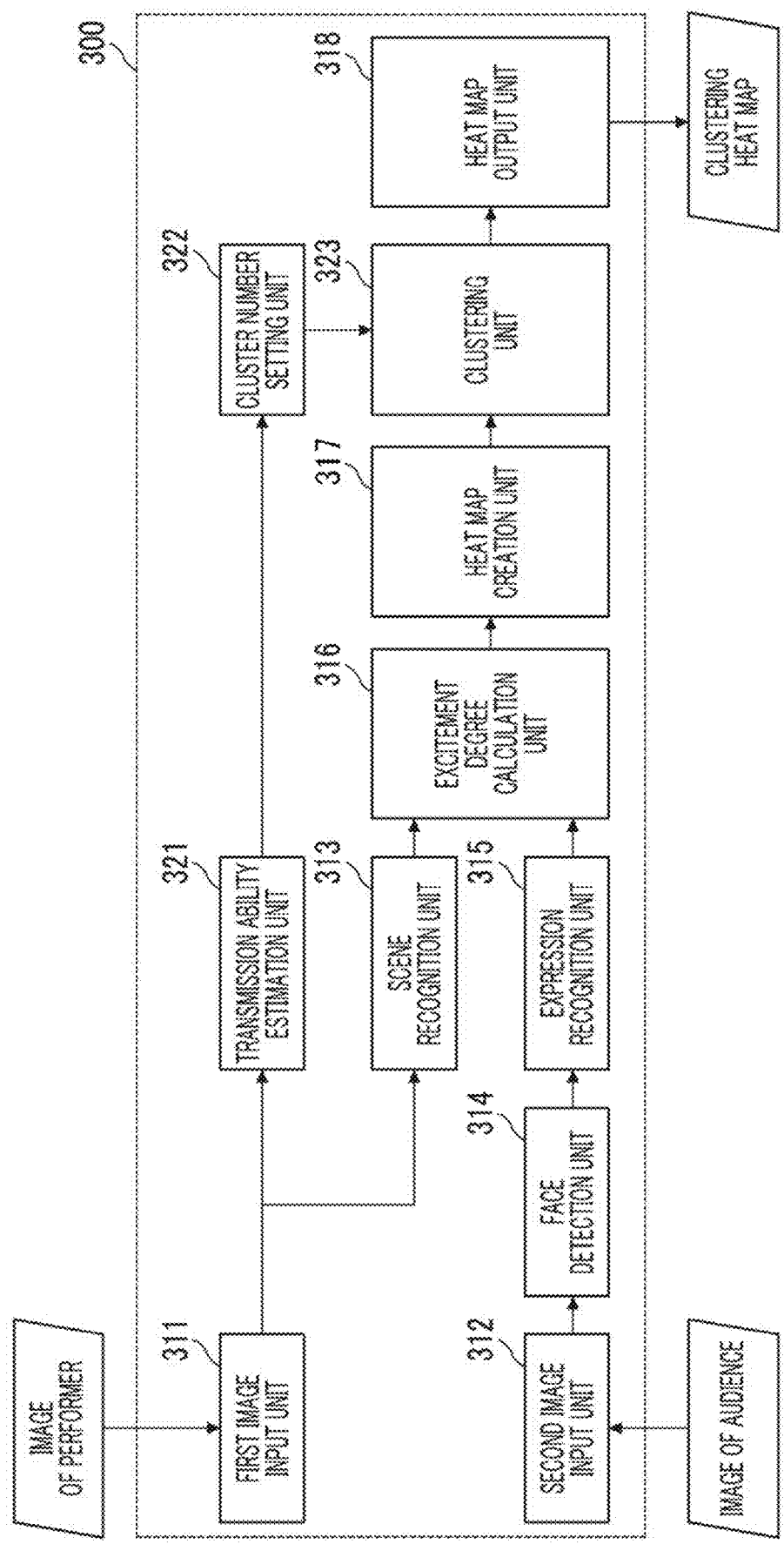
FIG. 12 is a block diagram of functions realized by the information processing apparatus.

FIG. 12 is a block diagram of functions realized by the information processing apparatus according to the present embodiment.

As shown in FIG. 12, the information processing apparatus 300 according to the present embodiment further comprises a transmission ability estimation unit 321, a cluster number setting unit 322, and a clustering unit 323.

The transmission ability estimation unit 321 estimates a transmission ability of the performer based on the image of the performer captured by the performer imaging apparatus 100 (first imaging unit). As used herein, the term "transmission ability" means an ability regarding the excitement. The transmission ability is defined by the skill and remaining power of the performer. In the present embodiment, the transmission ability is defined by the remaining power of the performer, the remaining power is estimated from the image of the performer to estimate the transmission ability. The remaining power is estimated from a degree of fatigue of the performer. Specifically, the expression of the performer is recognized, the degree of fatigue is determined from the expression to estimate the remaining power. A known technology can be adopted as the technology of recognizing the expression from the image and the technology of determining the degree of fatigue from the expression. For example, the expression recognition and the determination of the degree of fatigue can be made by using the image recognition model generated by machine learning, deep learning, or the like. The degree of fatigue is represented, for example, by a numerical value, and the remaining power (transmission ability) is obtained from the numerical value indicating the degree of fatigue. For example, the degree of fatigue is converted into a remaining power (transmission ability) using a predetermined conversion expression. In this case, the remaining power is converted to a lower numerical value as the degree of fatigue is higher, and the remaining power is converted to a higher numerical value as the degree of fatigue is lower. The transmission ability estimation processing may be performed at predetermined time intervals.

The cluster number setting unit 322 sets the number of clusters for clustering based on information on the transmission ability estimated by the transmission ability estimation unit 321. The relationship between the set number of clusters and the transmission ability is defined, for example, in the form of a table or the like, and is stored in the ROM 302, the RAM 303, or the HDD 304. The cluster number setting unit 322 decides (sets) the number of clusters based on the transmission ability estimated by the transmission ability estimation unit 321 with reference to a table or the like.

The number of clusters is set such that the number of clusters is larger as the transmission ability is higher. That is, the number of clusters is set to be larger as the transmission ability indicating the remaining power for excitement is higher. This means that the power to control the performance is present as the remaining power is larger. That is, it means that the power to make the excitement uniform is present even in a state in which the excitement varies. In addition it also means that the power regarding the excitement is present even not in an exciting state.

The clustering unit 323 clusters the heat map according to the number of clusters set by the cluster number setting unit 322. Specifically, heat map data is clustered according to the set number of clusters, and the heat map (clustering heat map) in which each cluster is displayed separately by the color or the shading is created. The heat map data is data representing the degree of excitement of each audience in association with the position of each audience. A known method can be adopted for clustering. For example, clustering processing based on a k-means method can be adopted.

Figure 13:
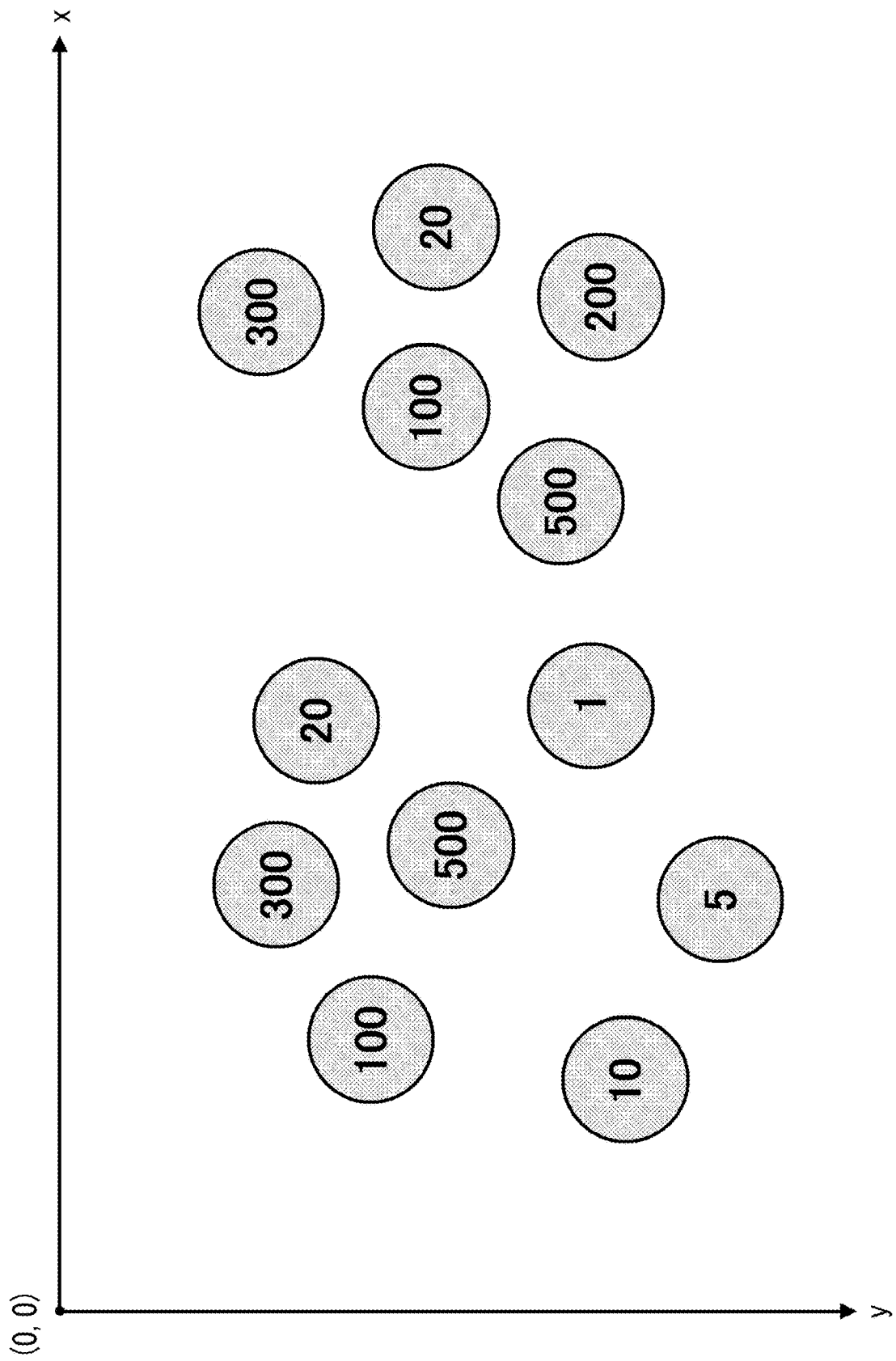
FIG. 13 is a conceptual diagram of clustering processing.
Figure 14:
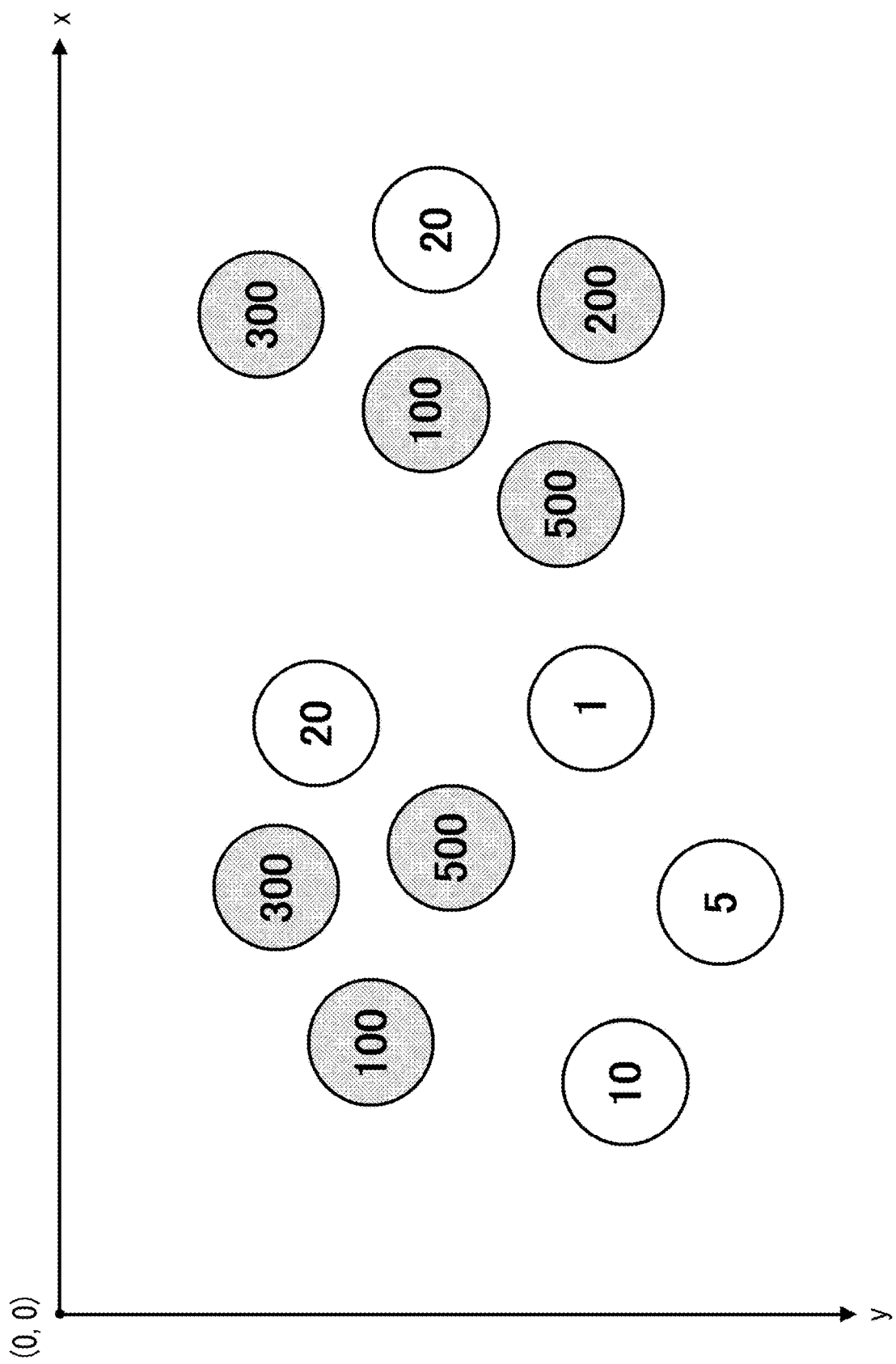
FIG. 14 is a conceptual diagram of the clustering processing.
Figure 15:
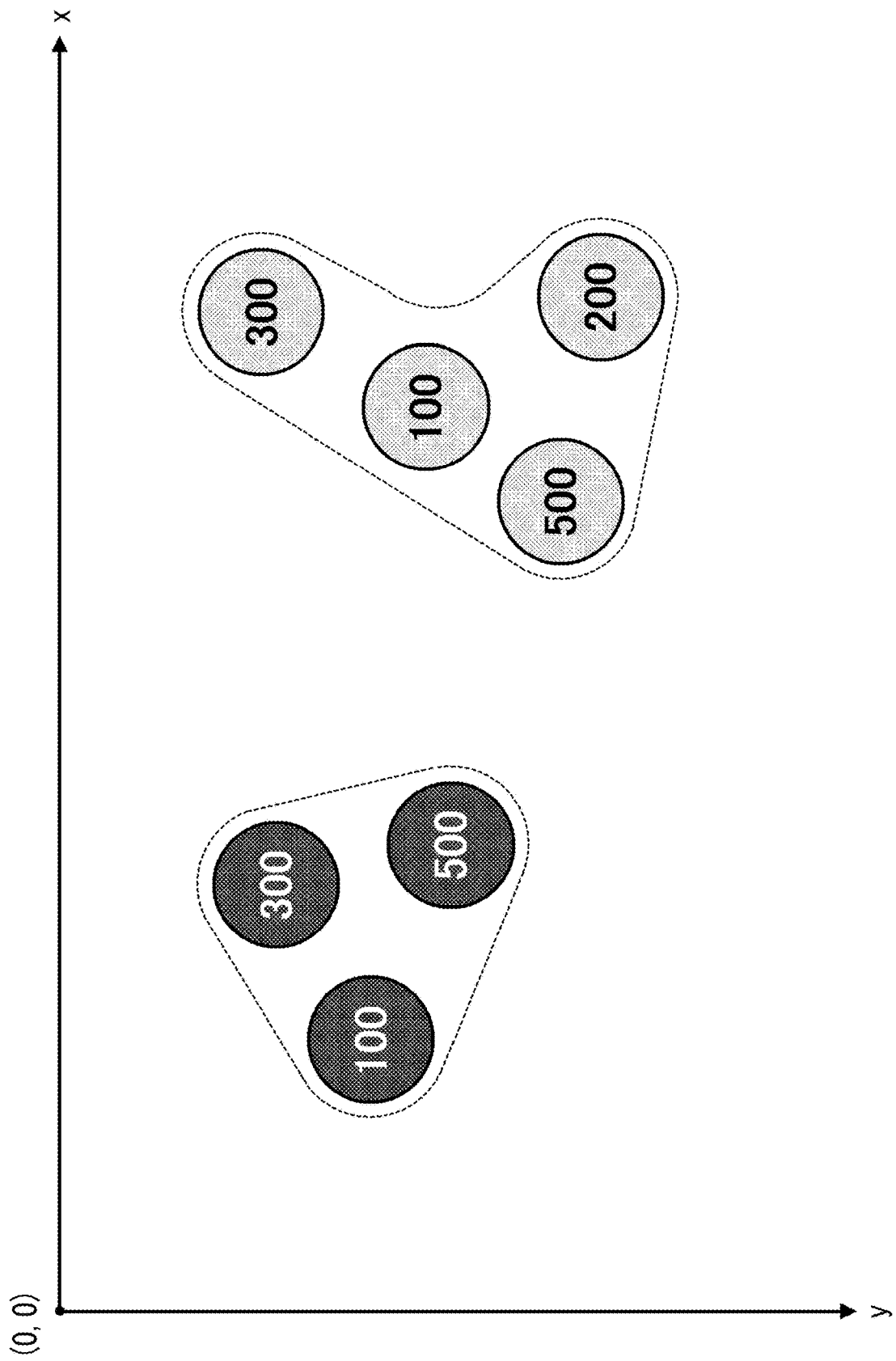
FIG. 15 is a conceptual diagram of the clustering processing.

FIGS. 13 to 15 are conceptual diagrams of the clustering processing.

FIG. 13 is a diagram showing an example of the heat map data. In FIG. 13, each circle represents the position of each audience in the area. The position of each audience (position of the circle) is specified by the coordinate position (x,y). In addition, the numerical value in each circle indicate the degree of excitement of the audience in each circle.

First, the data of the audience having the degree of excitement less than a threshold value is eliminated from the heat map data. In a case in which the threshold value of the degree of excitement is set to 100, the data of the audience having the degree of excitement less than 100 is eliminated. In FIG. 14, the eliminated data of the audience is shown by a white circle, and the data of the other audiences is shown by a gray circle.

Then, the heat map data is clustered with the set number of clusters for the data of the audience having the degree of excitement equal to or more than the threshold value (clustering processing). Specifically, a distance of the (x,y) coordinate is clustered as a distance of the k-means method. In this case, the distance of the (x,y) coordinate is defined by $\{(x\_i-x)^2+(y\_i-y)^2\}^{0.5}$.

Then, an average value of the degrees of excitement of the clusters is calculated. Each cluster is displayed separately by the color or the shading according to the calculated average value of the degree of excitement. As a result, as shown in FIG. 15, the clustered heat map (clustering heat map) is created.

The following method can also be adopted for the clustering processing. The distance of k-means is defined by the (x,y) coordinate and a weighted addition value of the degree of excitement, and clustering is performed by the k-means method. In this case, the distance of k-means is defined by $w1\times\{(x\_i-x)^2+(y\_i-y)^2\}^{0.5}+w2\times|h\_i-h|$.

The heat map output unit 318 outputs the heat map clustered by the clustering unit to the display device 400. That is, the heat map (clustering heat map) in which each cluster is displayed separately by the color or the shading is output to the display device 400.

Figure 16:
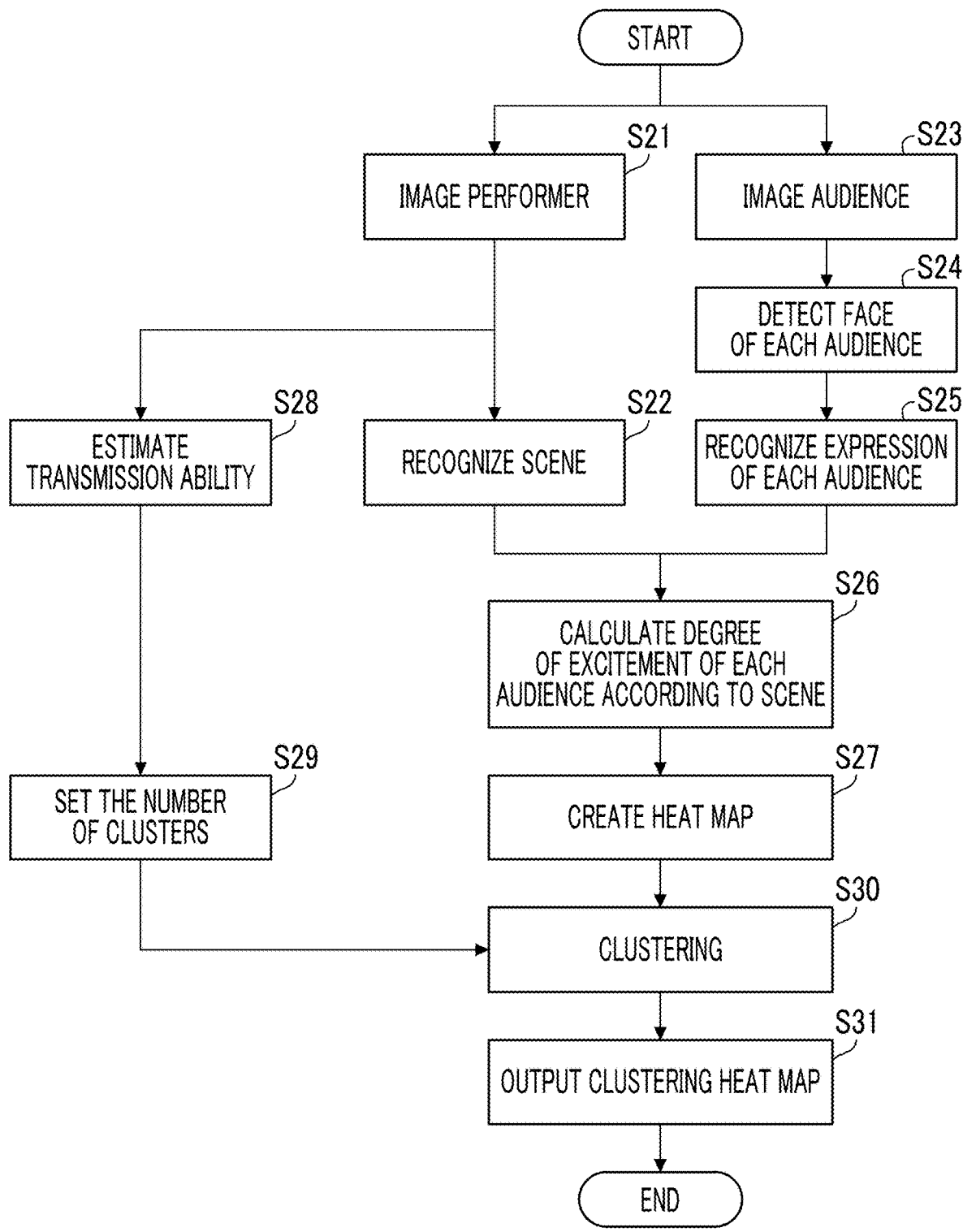
FIG. 16 is a flowchart showing the information processing procedure.

FIG. 16 is a flowchart showing the information processing procedure (information processing method) by the information processing system according to the present embodiment.

First, the performer 1 is imaged by the performer imaging apparatus 100 (step S21). In parallel with this, the audience area 3 is imaged by the audience imaging apparatus 200, and the audience 2 in the audience area 3 is imaged (step S23).

Then, the scene of the performance performed by the performer 1 is recognized from the image of the performer 1 captured by the performer imaging apparatus 100 (step S22). In addition, the face of each audience 2 is detected from the image of the audience area 3 captured by the audience imaging apparatus 200 (step S24), and the expression of the detected face is recognized (step S25). Further, the transmission ability of the performer 1 is estimated from the image of the performer 1 captured by the performer imaging apparatus 100 (step S28), and the number of clusters is set based on the estimated transmission ability (step S29). In the present embodiment, the remaining power regarding the excitement is estimated as the transmission ability, and the number of clusters is set based on the estimated remaining power.

Then, the degree of excitement of each audience 2 according to the scene is calculated based on the recognition result of the scene and the recognition result of the expression (step S26). Then, the heat map is created based on the calculated information on the degree of excitement of each audience 2 (step S27).

Then, the heat map is clustered according to the set number of clusters (step S30). As a result, the heat map (clustering heat map) in which each cluster is displayed separately by the color or the shading is created.

Figure 17:
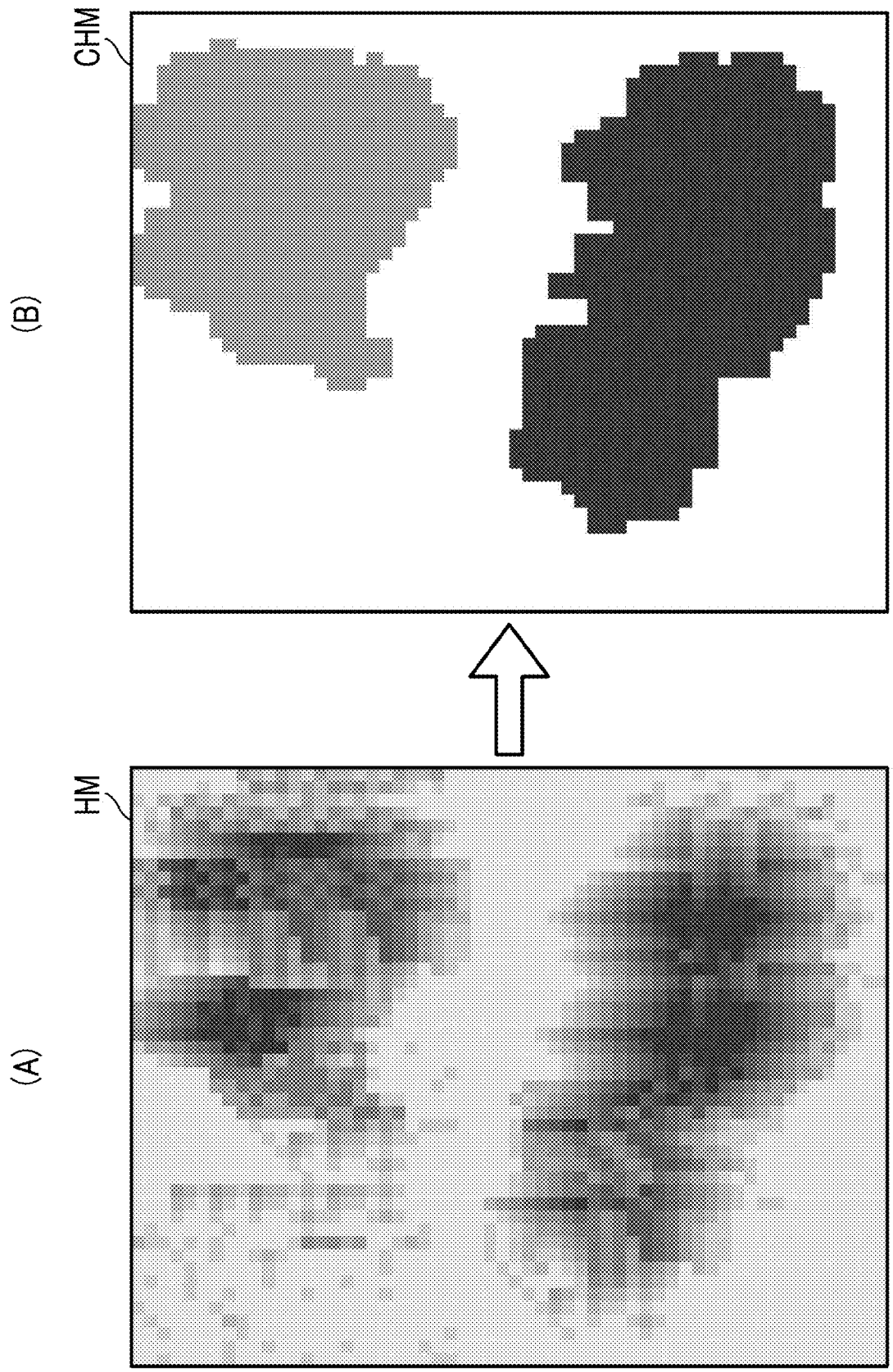
FIG. 17 is a conceptual diagram of a change in the heat map due to the clustering processing.

FIG. 17 is a conceptual diagram of a change in the heat map due to the clustering processing. FIG. 17 shows an example in a case in which the number of clusters is 2. (A) of FIG. 17 is the heat map HM before clustering, and (B) of FIG. 17 is a heat map (clustering heat map) CHM after clustering. As shown in FIG. 17, after clustering, the color or the shading is displayed for each cluster.

The created clustering heat map is output and displayed on the display device 400 (step S18). By visually recognizing the clustering heat map displayed on the display device 400, the performer 1 can grasp the excitement state of the audience in the audience area 3. In the clustering heat map, the color or the shading is displayed for each cluster, so that the state of the audience can be intuitively grasped. In addition, since the number of clusters is set according to the transmission ability of the performer 1 (here, the remaining power regarding the excitement), it is also possible to easily control the content of the performance. That is, for example, in a case in which there is no remaining power, clustering is performed with a small number of clusters, so that the content of performance to be performed can be easily decided.

It should be noted that, in the embodiment described above, the remaining power of the performer is used as the transmission ability, but the skill of the performer can also be used as the transmission ability. In addition, both the remaining power and the skill can be used as the transmission ability.

Third Embodiment

In the information processing system according to the present embodiment, in a case in which the heat map is clustered and output, the number of clusters is set based on the transmission ability set by a user (for example, the performer). The information processing system according to the present embodiment is the same as the information processing system according to the second embodiment, except that the number of clusters is set based on the transmission ability set by the user. Therefore, only the difference will be described in the following.

Figure 18:
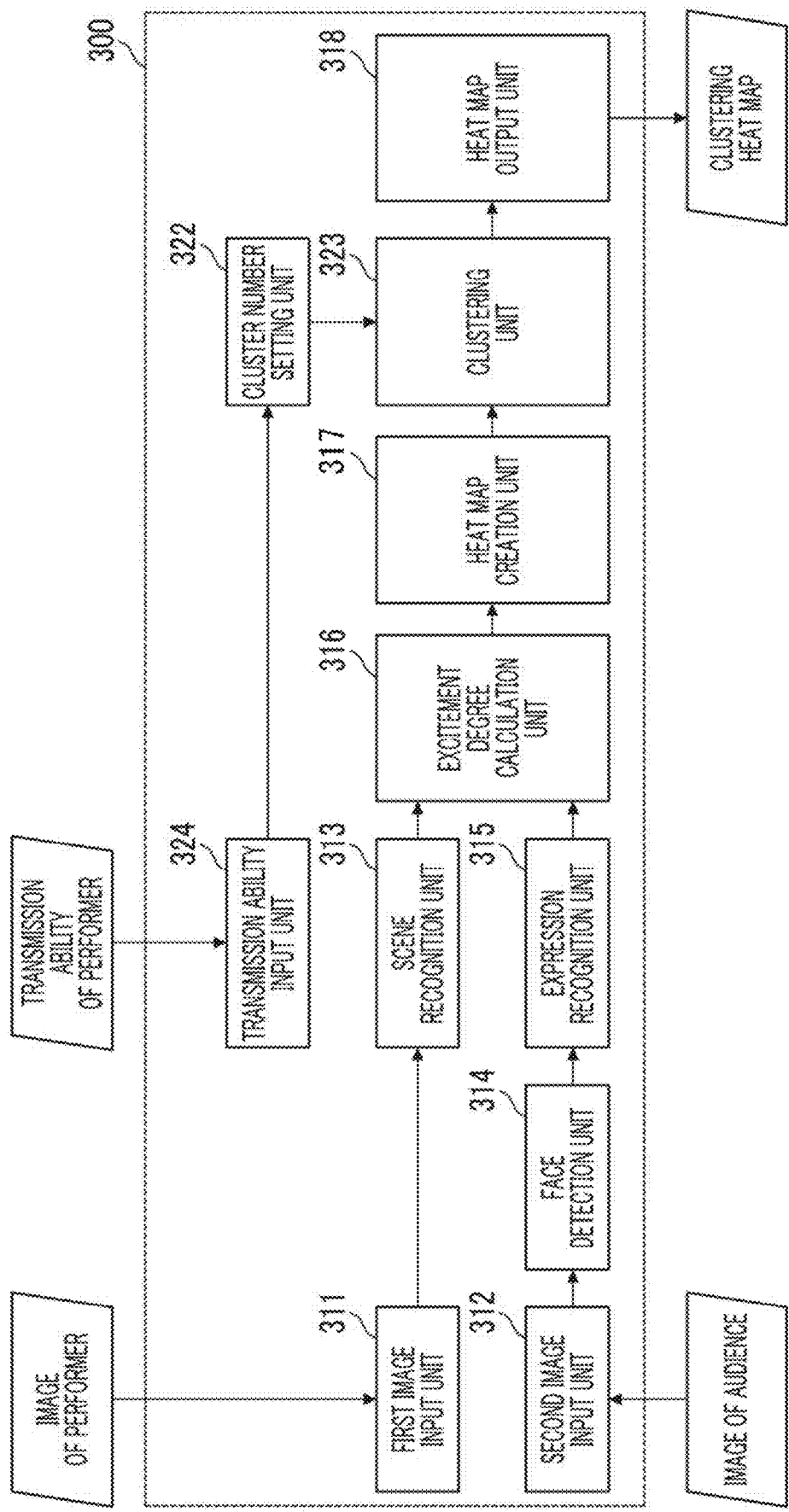
FIG. 18 is a block diagram of functions realized by the information processing apparatus.

FIG. 18 is a block diagram of functions realized by the information processing apparatus according to the present embodiment.

As shown in FIG. 18, the information processing apparatus 300 according to the present embodiment comprises a transmission ability input unit 324. The transmission ability input unit 324 accepts the input of the transmission ability. As described above, the transmission ability is defined by the skill and the remaining power of the performer. The transmission ability input unit 324 accepts the input of the transmission ability from the operation unit 305. For example, in the transmission ability, regarding the skill, a plurality of levels are defined in advance, and one of the plurality of levels is selected and input. Similarly, regarding the remaining power, a plurality of levels are defined in advance, and one of the plurality of levels is selected and input. The information on the transmission ability input to the transmission ability input unit 324 is added to the cluster number setting unit 322.

The cluster number setting unit 322 sets the number of clusters based on the input information on the transmission ability. In a case in which the transmission ability is defined by both the skill and the remaining power, the number of clusters is set based on the information of the skill and the remaining power.

The clustering unit 323 performs clustering processing on the heat map according to the number of clusters set by the cluster number setting unit 322.

Also in the information processing system according to the present embodiment, since the heat map is clustered according to the transmission ability of the performer and presented, the content of the performance to be performed can be easily decided.

Fourth Embodiment

In the information processing system according to the present embodiment, in a case in which the heat map is clustered and output, the number of clusters is set based on the transmission ability set by the user (for example, the performer) and the transmission ability estimated from the image captured by the performer.

Figure 19:
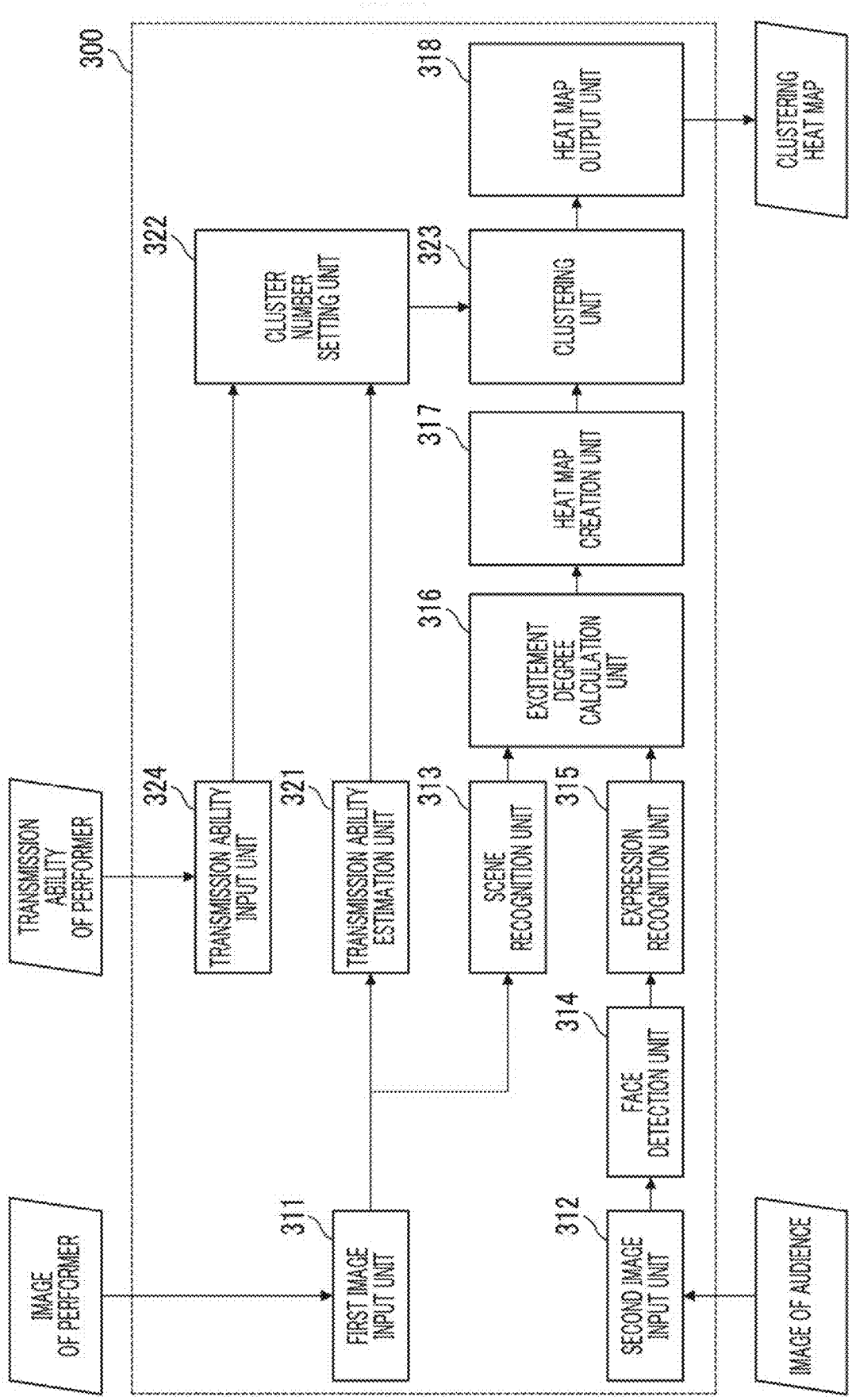
FIG. 19 is a block diagram of functions realized by the information processing apparatus.

FIG. 19 is a block diagram of functions realized by the information processing apparatus according to the present embodiment.

As shown in FIG. 19, the information processing apparatus 300 according to the present embodiment comprises the transmission ability estimation unit 321 and the transmission ability input unit 324.

The transmission ability estimation unit 321 estimates a first transmission ability of the performer from the image obtained by imaging the performer. In the present embodiment, the remaining power of the performer is estimated as the first transmission ability.

The transmission ability input unit 324 accepts the input of a second transmission ability from the user (for example, the performer). In the present embodiment, the input of the skill of the performer is accepted as the second transmission ability.

The information of the first transmission ability (remaining power) estimated by the transmission ability estimation unit 321 and the information of the second transmission ability (skill) input to the transmission ability input unit 324 are added to the cluster number setting unit 322.

The cluster number setting unit 322 sets the number of clusters based on the information of the first transmission ability (remaining power) and the information of the second transmission ability (skill).

The clustering unit 323 performs clustering processing on the heat map according to the number of clusters set by the cluster number setting unit 322.

Also in the information processing system according to the present embodiment, since the heat map is clustered according to the transmission ability of the performer and presented, the content of the performance to be performed can be easily decided.

It should be noted that, in the present embodiment, the configuration has been adopted in which the transmission ability estimation unit 321 estimates the remaining power and the transmission ability input unit 324 inputs the skill. However, a configuration may be adopted in which the transmission ability estimation unit 321 estimates the skill and the transmission ability input unit 324 inputs the remaining power.

Fifth Embodiment

As described above, the heat map is created by displaying the degree of excitement of each audience in association with the position of each audience. The position of each audience is specified from the image captured by the audience imaging apparatus 200. A viewpoint of the image captured by the audience imaging apparatus 200 is different from a viewpoint of the performer. In the information processing system according to the present embodiment, an image of the heat map is transformed into an image of a different viewpoint and presented. That is, the image of the heat map is transformed into an image of the viewpoint of the performer (image close to the viewpoint of the performer) and presented.

Figure 20:
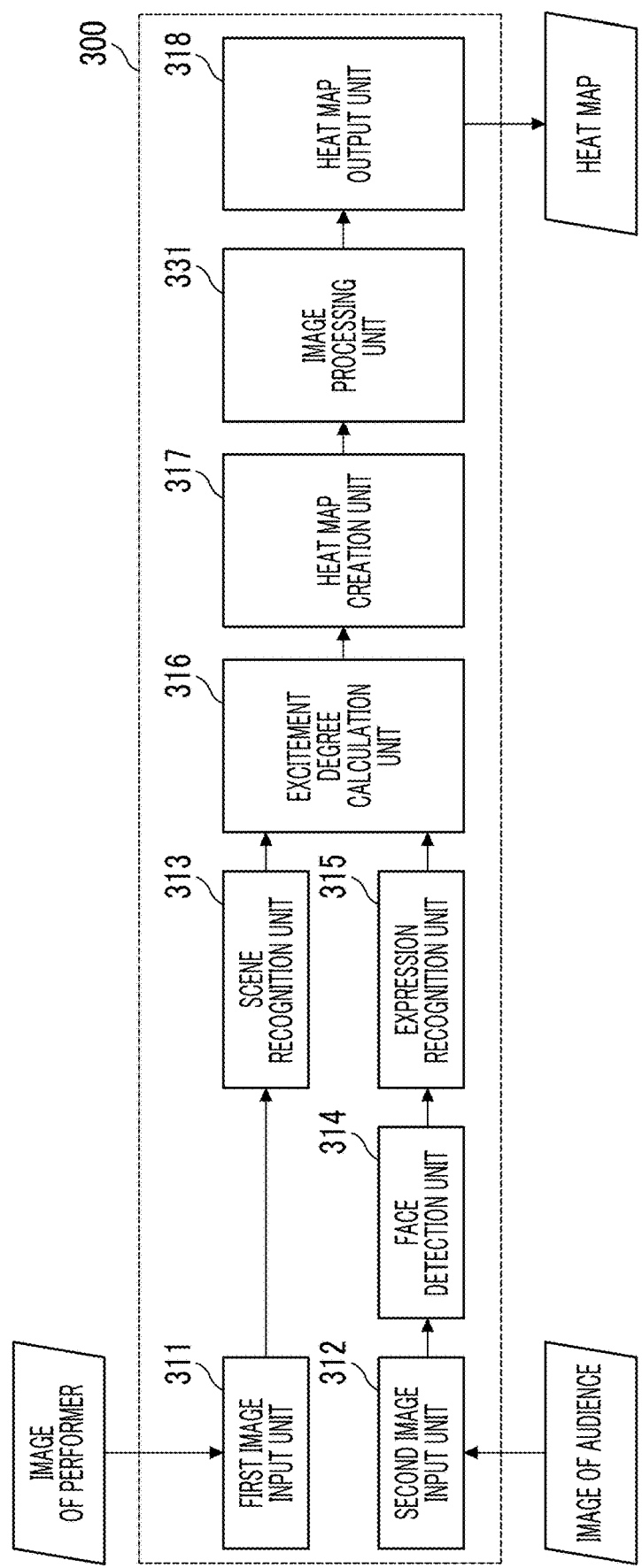
FIG. 20 is a block diagram of functions realized by the information processing apparatus.

FIG. 20 is a block diagram of functions realized by the information processing apparatus according to the present embodiment.

As shown in FIG. 20, the information processing apparatus 300 according to the present embodiment further comprises an image processing unit 331. The information processing apparatus 300 according to the present embodiment is the same as the information processing apparatus according to the first embodiment, except that the image processing unit 331 is provided. Therefore, only the matters related to the image processing unit 331 will be described in the following.

The image processing unit 331 is an example of a transformation processing unit. The image processing unit 331 processes the image of the heat map created by the heat map creation unit 317, and generates the heat map with a changed viewpoint. Specifically, the image processing unit 331 performs projective transformation processing on the image of the heat map created by the heat map creation unit 317 to be transformed into the image of the viewpoint of the performer. It should be noted that it is difficult to make the image perfectly match the image of the viewpoint of the performer. Therefore, here, the image is transformed to the image close to the viewpoint of the performer. Specifically, the image is transformed into an image of the viewpoint of the performer in a case in which the performer stands at a predetermined position on a stage.

Figure 21:
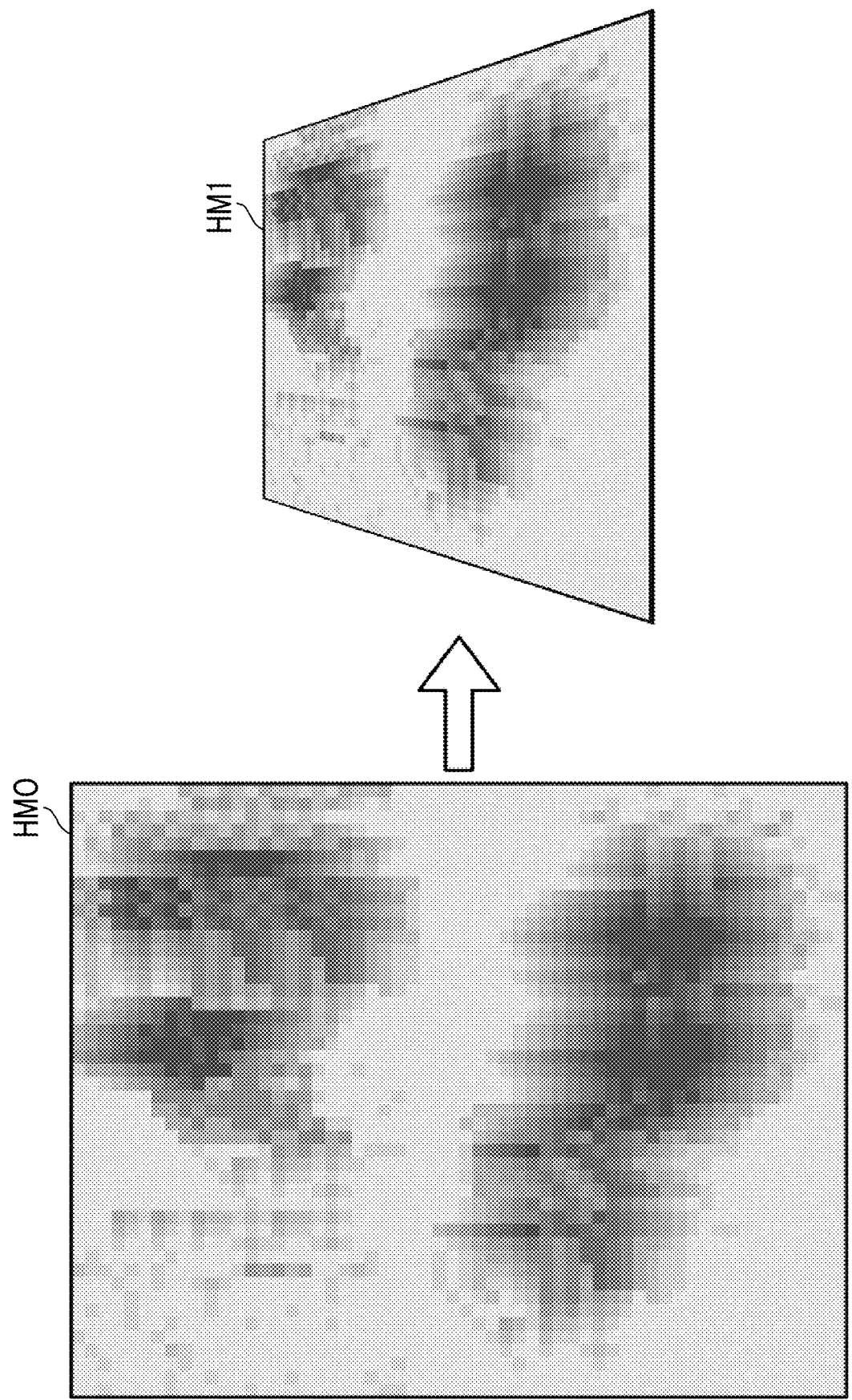
FIG. 21 is a diagram showing an example of transformation of an image of the heat map.

FIG. 21 is a diagram showing an example of transformation of the image of the heat map. (A) of FIG. 21 shows a heat map HM0 before the transformation processing, and (B) of FIG. 21 shows a heat map HM1 after the transformation processing.

In this way, by presenting the heat map according to the image of the viewpoint of the performer, it is possible to more easily grasp the state.

It should be noted that a configuration can be adopted in which the display is switched in response to an instruction from the user (for example, the performer). In this case, for example, the display is switched by the input of the instruction of the operation unit 305.

In addition, this processing can also be performed on the clustered heat map (clustering heat map).

Sixth Embodiment

In the information processing system according to the present embodiment, the heat map is inverted and presented in response to the instruction from the user (for example, the performer). That is, for example, in a case in which the heat map is displayed by the color, the color is inverted and presented. In addition, for example, in a case in which the heat map is displayed by the shading of a specific color, the shading of the color is inverted and presented.

Figure 22:
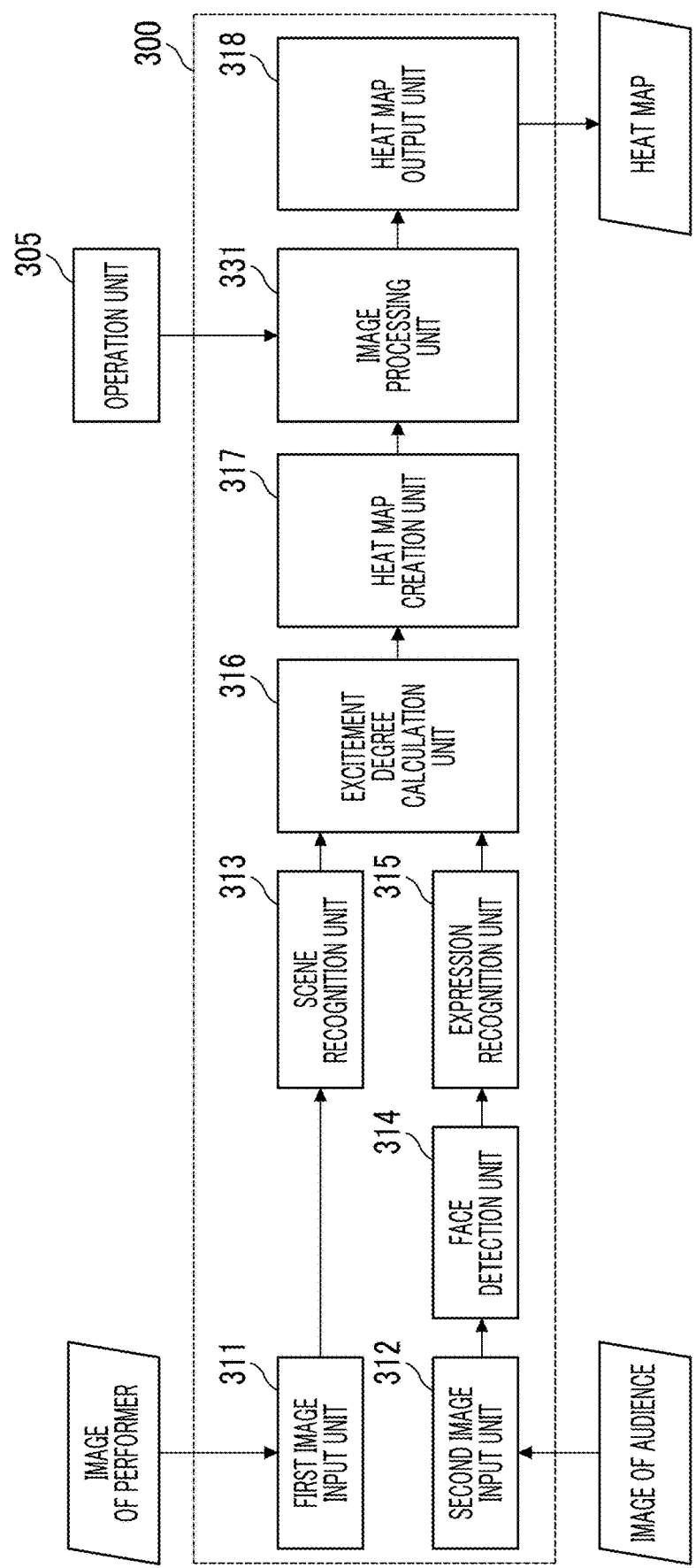
FIG. 22 is a block diagram of functions realized by the information processing apparatus.

FIG. 22 is a block diagram of functions realized by the information processing apparatus according to the present embodiment.

As shown in FIG. 22, the information processing apparatus 300 according to the present embodiment further comprises an image processing unit 331. The information processing apparatus 300 according to the present embodiment is the same as the information processing apparatus according to the first embodiment, except that the image processing unit 331 is provided. Therefore, only the matters related to the image processing unit 331 will be described in the following.

The image processing unit 331 is an example of an inversion processing unit. The image processing unit 331 processes the image of the heat map according to the input of the inversion instruction from the operation unit 305, and generates the heat map in which the color or the shading of the color is inverted.

Figure 23:
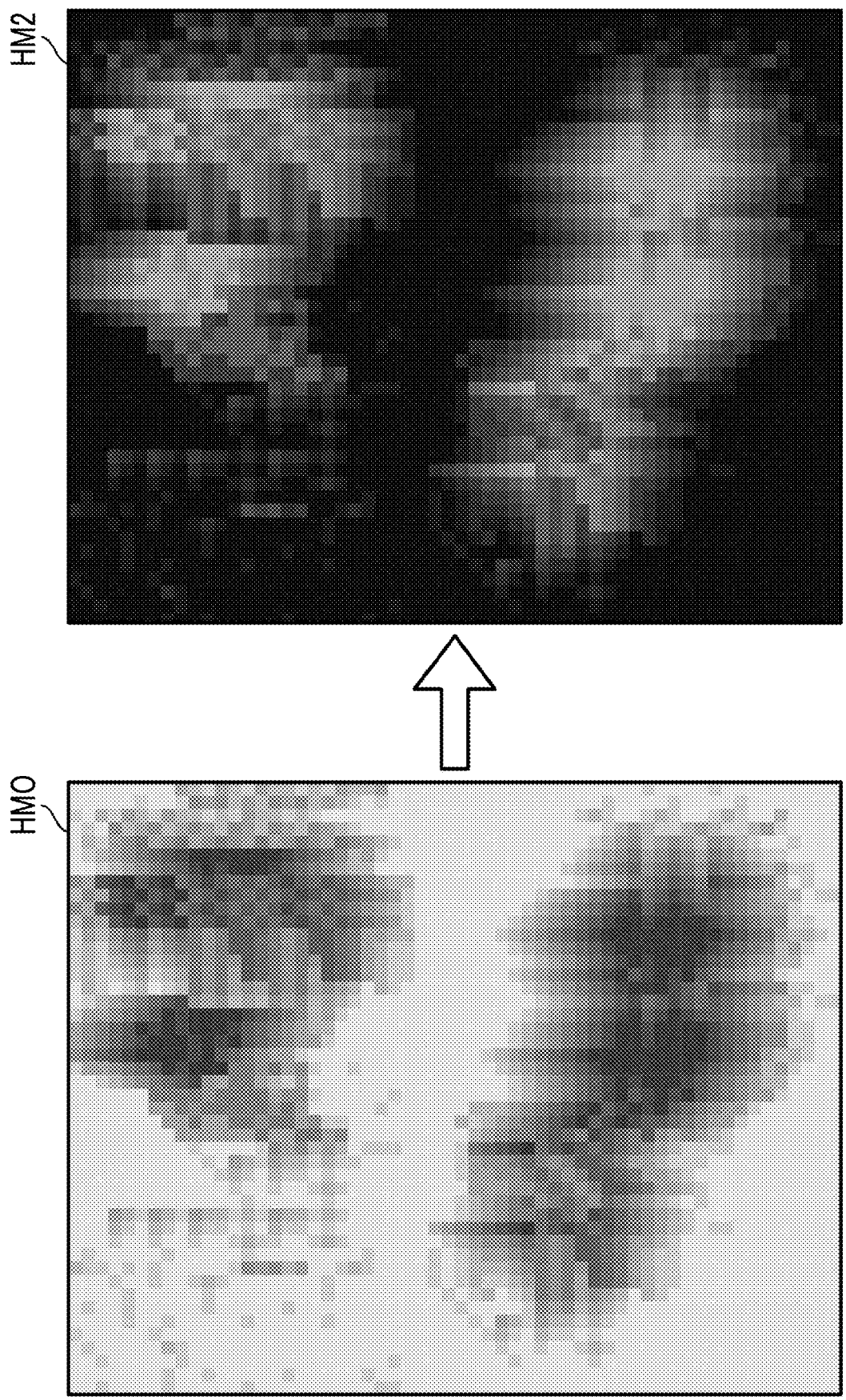
FIG. 23 is a diagram showing an example of inversion processing of the image of the heat map.

FIG. 23 is a diagram showing an example of inversion processing of the image of the heat map. FIG. 23 shows an example in a case in which the heat map is created by the shading of the specific color. (A) of FIG. 23 shows the heat map HM0 before the inversion processing, and (B) of FIG. 23 shows a heat map HM2 after the inversion processing. As shown in FIG. 23, the shading is inverted and displayed by the inversion processing.

In this way, by enabling the display to be switched, it is possible to present the optimum heat map depending on the purpose. For example, in a case in which the audience, who is not excited, is made to be excited, the heat map is displayed in the normal form. On the other hand, in a case in which the audience, who is excited, is made to be more excited, the inverted heat map is displayed. As a result, it is possible to more easily control the content of performance.

It should be noted that this processing can also be performed on the clustered heat map (clustering heat map).

Seventh Embodiment

Figure 24:
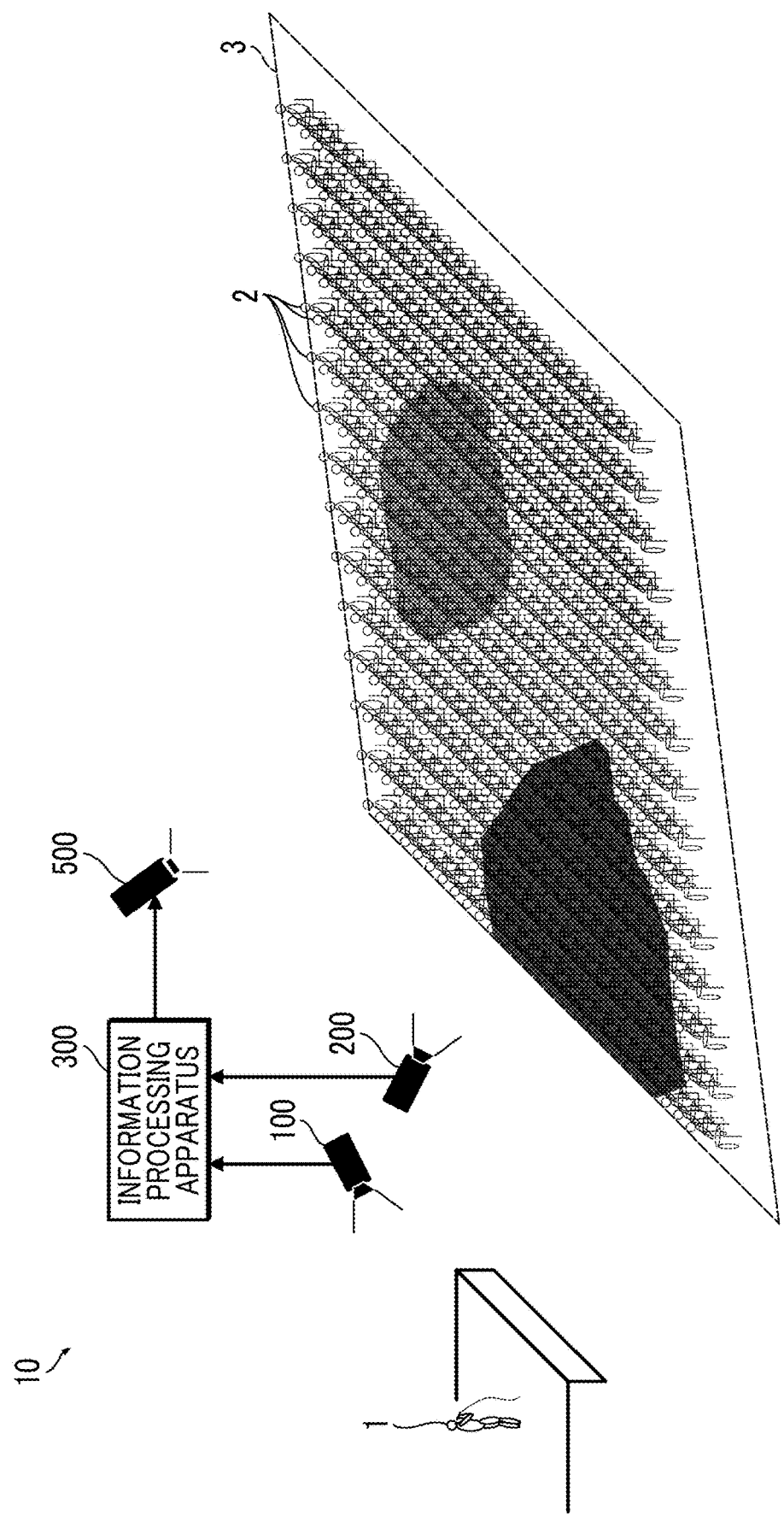
FIG. 24 is a diagram showing a schematic configuration of the information processing system.

FIG. 24 is a diagram showing a schematic configuration of the information processing system according to the present embodiment.

As shown in FIG. 24, the information processing system 10 according to the present embodiment comprises a projection device 500 instead of the display device 400. The information processing system 10 according to the present embodiment is the same as the information processing system according to the first embodiment, except that the projection device 500 is provided in place of the display device 400. Therefore, only the configuration related to the projection device 500 will be described in the following.

The projection device 500 is an example of a projection unit. The projection device 500 is configured by at least one projector, and projects the heat map (including the clustering heat map) output from the heat map output unit 318 onto the audience area 3 of the audience 2. In a case in which the audience area 3 of the audience 2 cannot be projected by one projector, the projection device 500 is configured by combining a plurality of projectors. In this case, the audience area 3 of the audience 2 is divided into a plurality of areas, and each area is shared and projected by the plurality of projectors.

With the information processing system according to the present embodiment, the heat map is projected onto the audience area 3 of the audience 2, so that the state of excitement of the audience can be grasped at a glance. In addition, since performer don't have to confirm the display device, the performer can focus on the performance. In addition, the audience can also be aware of his/her degree of excitement.

It should be noted that since the audience area 3 of the audience 2 is usually not flat, it is preferable to adopt a projection mapping method for projection.

OTHER EMBODIMENTS

[Regarding Scene Recognition]

In the embodiment described above, the configuration has been adopted in which the scene of the performance is recognized based on the image obtained by imaging the performer, but the scene of the performance can also be recognized by using other information. For example, a configuration can be adopted in which the scene is recognized by using voice or information on voice and image. In this case, a sound collection unit that collects the voice accompanying the performance is further provided.

[Regarding Degree of Excitement]

In the embodiment described above, the configuration has been adopted in which the degree of excitement is calculated from the expression of the audience, but the degree of excitement may be calculated by using other information as well. For example, the degree of excitement may be calculated by using information on voice uttered by each audience, information on body shaking, information on body temperature, and the like. In this case, a sound collection unit that collects voice uttered by each audience, a sensor that detects the body shaking of each audience, a sensor that detects the body temperature of each audience, and the like are provided. In addition, an input unit that inputs such information is provided.

[Regarding Estimation of Transmission Ability]

In the embodiment described above, the configuration has been adopted in which the transmission ability of the performer is estimated based on the image obtained by imaging performer, but the transmission ability can also be estimated by using other information. For example, a configuration can be adopted in which the transmission ability is estimated based on the voice (voice volume, voice quality, and the like) uttered by the performer. In addition, a configuration can be adopted in which the transmission ability is estimated based on both the voice uttered by the performer and the image of the performance. In this case, for example, the performer imaging apparatus 100 images a motion picture with voice.

In addition, a configuration can be adopted in which the skill of the performer is estimated from the state of the audience. That is, the degree of excitement of the audience differs depending on the skill, so that the skill of the performer can be estimated from the degree of excitement of the audience. In this case, for example, a configuration can be adopted in which the skill of the performer is estimated based on the information on the degree of excitement of each audience calculated by the degree of excitement degree calculation unit 316 or the heat map created by the heat map creation unit 317.

In addition, in general, the ability regarding the excitement largely depends on the experience of the performer. Therefore, an experience value of the performer (years of experience, execution number of events, and the like) can be included in the transmission ability.

[Regarding Display of Heat Map]

A configuration can be adopted in which the heat map is displayed on the display device (so-called wearable device) used by being worn by the performer. For example, a configuration can be adopted in which the heat map is displayed on a wristwatch-type or eyeglass-type display device.

In addition, a configuration can be adopted in which the heat map is presented to the audience. For example, a configuration can be adopted in which the heat map information is delivered to a portable terminal (for example, a smartphone) owned by the audience.

[Regarding Information Processing Apparatus]

A part or all of the functions realized by the information processing apparatus can be realized by various processors. The various processors include the central processing unit (CPU) that is a general-purpose processor executing the program and functioning as the various processing units, a programmable logic device (PLD) that is a processor whose circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC). The program is synonymous with the software.

One processing unit may be configured by one of these various processors or may be configured by two or more processors of the same type or different types. For example, one processing unit may be configured by a plurality of FPGAs or a combination of the CPU and the FPGA. In addition, a plurality of the processing units may be configured by one processor. As an example of configuring a plurality of processing units with one processor, first, as represented by a computer such as a client or a server, there is a form in which one processor is configured by a combination of one or more CPUs and software, and the processor functions as a plurality of processing units. Second, as represented by a system on chip (SoC), there is a form in which a processor is used that realizes the functions of the entire system including a plurality of processing units with a single integrated circuit (IC) chip. In this way, the various processing units are configured by one or more of various processors described above as the hardware structures.

EXPLANATION OF REFERENCES

1: performer
2: audience
3: audience area
10: information processing system
100: performer imaging apparatus
200: audience imaging apparatus
300: information processing apparatus
301: CPU
302: ROM
303: RAM
304: HDD
305: operation unit
307: input interface
308: output interface
311: first image input unit
312: second image input unit
313: scene recognition unit
314: face detection unit
315: expression recognition unit
316: excitement degree calculation unit
317: heat map creation unit
318: heat map output unit
321: transmission ability estimation unit
322: cluster number setting unit
323: clustering unit
324: transmission ability input unit
331: image processing unit 400: display device
500: projection device
F: frame surrounding detected face
HM: heat map
HM0: heat map
HM1: heat map after transformation processing
HM2: heat map after inversion processing
I2: image obtained by imaging audience
IF: face image of audience
S11 to S18: information processing procedure by information processing system
S21 to S31: information processing procedure by information processing system

What is claimed is:

1. An information processing system comprising:
a processor; and
a memory connected to the processor,
wherein the processor is configured to
perform first recognition in which a scene is recognized based on an image obtained by imaging a performer,
perform second recognition in which expression of a person in a predetermined area is recognized based on an image obtained by imaging the person,
calculate a state index of the person according to the scene based on a recognition result of the scene and a recognition result of the expression of the person,
create a heat map representing the state index of the person in association with a position of the person in the predetermined area, and
output the heat map.

2. The information processing system according to claim 1,
wherein the processor is further configured to
set a number of clusters based on a transmission ability of the performer,
perform clustering on the heat map according to the set number of clusters, and
in the output, output the clustered heat map.

3. The information processing system according to claim 2,
wherein the processor is further configured to, in the clustering, perform clustering on the heat map for data of the person having the state index equal to or more than a threshold value.

4. The information processing system according to claim 2,
wherein the processor is further configured to estimate the transmission ability of the performer based on the image obtained by imaging the performer.

5. The information processing system according to claim 2,
wherein the transmission ability includes at least one of skill or remaining power of the performer.

6. The information processing system according to claim 1,
wherein the processor is further configured to transform an image of the heat map into an image of a viewpoint different from the image obtained by imaging the person in the predetermined area.

7. The information processing system according to claim 1,
wherein the processor is further configured to invert color or shading of the heat map.

8. The information processing system according to claim 1, further comprising:
a display that displays the heat map output from the processor.

9. The information processing system according to claim 1, further comprising:
a projector that projects the heat map output from the processor onto the predetermined area.

10. The information processing system according to claim 9,
wherein the projector projects the heat map onto the predetermined area by projection mapping.

11. The information processing system according to claim 1, further comprising:
a first camera that images the performer; and
a second camera that images the person in the predetermined area.

12. An information processing method comprising:
imaging a performer;
imaging a person in a predetermined area;
recognizing a scene based on an image obtained by imaging the performer;
recognizing expression of the person in the predetermined area based on an image obtained by imaging the person;
calculating a state index of the person according to the scene based on a recognition result of the scene and a recognition result of the expression of the person;
creating a heat map representing the state index of the person in association with a position of the person in the predetermined area; and
outputting the heat map.

13. The information processing method according to claim 12, further comprising:
setting a number of clusters based on information on a transmission ability of the performer; and
performing clustering on the heat map according to the set number of clusters,
wherein, in the output of the heat map, the clustered heat map is output.

* * * * *